(12) United States Patent
Saika et al.

(10) Patent No.: US 7,714,042 B2
(45) Date of Patent: May 11, 2010

(54) COATING COMPOSITION FOR CANS

(75) Inventors: Masaaki Saika, Kanagawa (JP); Hideki Matsuda, Kanagawa (JP); Yuuichi Inada, Kanagawa (JP); Naoki Horike, Kanagawa (JP); Sumio Noda, Kanagawa (JP); Hideki Masuda, Kanagawa (JP); Keiichi Shimizu, Kanagawa (JP); Hiromi Harakawa, Kanagawa (JP)

(73) Assignee: Kansai Paint Co., Ltd., Hyogo (JP)

( * ) Notice: Subject to any disclaimer, the term of this patent is extended or adjusted under 35 U.S.C. 154(b) by 633 days.

(21) Appl. No.: 11/727,176

(22) Filed: Mar. 23, 2007

(65) Prior Publication Data

US 2007/0283852 A1    Dec. 13, 2007

(30) Foreign Application Priority Data

Mar. 24, 2006  (JP)  ............................ P2006-083721
Mar. 27, 2006  (JP)  ............................ P2006-086673
Feb. 27, 2007  (JP)  ............................ P2007-047280

(51) Int. Cl.
*C08L 63/10*  (2006.01)
*C08L 63/00*  (2006.01)
*C08L 33/00*  (2006.01)
*B32B 15/092* (2006.01)
*B32B 27/38*  (2006.01)

(52) U.S. Cl. ...................... 523/413; 523/402; 523/403; 523/406; 523/407; 523/409; 523/410; 523/412; 525/523; 525/524; 525/529; 525/530; 525/531; 525/533

(58) Field of Classification Search ................ None
See application file for complete search history.

(56) References Cited

U.S. PATENT DOCUMENTS 5,942,570 A  *  8/1999  Matsukura et al. ........... 524/522

FOREIGN PATENT DOCUMENTS

| JP | 5-9431 | 1/1993 |
| JP | 9-67543 | 3/1997 |
| JP | 11-263938 | 9/1999 |

OTHER PUBLICATIONS

Machine Translation of JP 11-263938 A, provided by the JPO website (1999).*

* cited by examiner

*Primary Examiner*—Michael J Feely
(74) *Attorney, Agent, or Firm*—Foley & Lardner LLP

(57) ABSTRACT

The present invention provides a coating composition for cans comprising 100 parts by mass of a neutralized acrylic resin-modified epoxy resin (A), and from 1 to 50 parts by mass of anionic polymer crosslinked fine particles (B), (A) and (B) being dispersed in an aqueous medium, wherein the anionic polymer fine particles (B) are polymer fine particles comprising a polymer having an acid value of from 10 to 120 mg KOH/g and being produced by polymerizing radically polymerizable unsaturated monomers comprising from 2 to 30% by mass of a carboxyl group-containing radically polymerizable unsaturated monomer (b1), from 2 to 30% by mass of a polyvinyl compound (b2) and from 40 to 96% by mass of other radically polymerizable unsaturated monomer (b3) in the presence of water.

8 Claims, 1 Drawing Sheet

COATING COMPOSITION FOR CANS

FIELD OF THE INVENTION

The present invention relates to a coating composition for cans, which is useful to coat a constructional member of a metal can such as a can for foods such as drinks and fruits, and its lid, and which can form a coating film having excellent balance in bending processability, water whitening resistance and flavor properties.

BACKGROUND OF THE INVENTION

Conventionally, a coating composition for cans such as interior or exterior surface of a can or a can lid, provided with coating film performances such as processability, adhesion and corrosion resistance has been developed as a coating composition for cans. Conventionally, an aqueous resin composition for coating metals, comprising a water-dispersible fine particle resin having a shell part formed by a carboxyl group-containing self-emulsifiable epoxy resin derived from a bisphenol A type epoxy resin and a core part formed by a conjugated diene resin is proposed (Patent Document 1).

Further, there is an invention directed to a can paint having excellent adhesion and processability by dispersing core-shell fine particles in an aqueous resin composition comprising fine particle self-emulsifiable epoxy resin dispersed in an aqueous medium, wherein adhesion and processability of a coating film is improved by considering mutual adhesion between core-shell fine particles (island) and the part (sea) formed by polymerizing the fine particle self-emulsifiable epoxy resin, present in the coating film (Patent Document 2). Further, an aqueous coating composition comprising an acrylic resin-modified epoxy resin, a resol-type phenolic resin and a styrene copolymer rubber is proposed (Patent Document 3).

[Patent Document 1] JP-A-5-9431
[Patent Document 2] JP-A-9-67543
[Patent Document 3] JP-A-11-263938

SUMMARY OF THE INVENTION

However, the coating films in Patent Documents 1 to 3 are insufficient in at least one of bending processability, water whitening resistance and flavor properties, and are not yet put into practical use.

Accordingly, an object of the invention is to find a coating composition for cans, which can form a coating film having excellent bending processability, water whitening resistance and flavor properties.

As a result of extensive investigations to overcome the above-described problems, the present inventors have found that the above problems can be overcome by blending an acrylic resin-modified epoxy resin (A) and specific anionic polymer crosslinked fine particles (B), and preferably further blending a resol-type phenolic resin (C), and have reached to the completion of the invention.

Specifically, the invention provides the following coating composition for cans.

(1) A coating composition for cans comprising 100 parts by mass of a neutralized acrylic resin-modified epoxy resin (A), and from 1 to 50 parts by mass of anionic polymer crosslinked fine particles (B), (A) and (B) being dispersed in an aqueous medium, wherein the anionic polymer fine particles (B) are polymer fine particles comprising a polymer having an acid value of from 10 to 120 mg KOH/g and being produced by polymerizing radically polymerizable unsaturated monomers comprising from 2 to 30% by mass of a carboxyl group-containing radically polymerizable unsaturated monomer (b1), from 2 to 30% by mass of a polyvinyl compound (b2) and from 40 to 96% by mass of other radically polymerizable unsaturated monomer (b3) in the presence of water.

(2) The coating composition for cans as described in (1), further comprising from 0.1 to 10 parts by mass of an alkali thickening agent (C), which is an emulsion polymer having an acid value of from 50 to 500 mg KOH/g and being produced by polymerizing radically polymerizable unsaturated monomers comprising from 10 to 60% by mass of a carboxyl group-containing radically polymerizable unsaturated monomer (c1), 1% by mass or less of a polyvinyl compound (c2) and from 39 to 90% by mass of other radically polymerizable unsaturated monomer (c3) in the presence of water.

(3) The coating composition for cans as described in (1) or (2), wherein the anionic polymer crosslinked fine particles (B) are anionic polymer crosslinked fine particles (B1) obtained by:

a first step of emulsion polymerizing a mixture (1) of radically polymerizable monomers comprising 5% by mass or less of the carboxyl group-containing radically polymerizable unsaturated monomer (b1), from 4 to 35% by mass of the polyvinyl compound (b2) and from 60 to 96% by mass of other radically polymerizable unsaturated monomer (b31) in the presence of water to obtain an aqueous dispersion (I); and a second step of emulsion polymerizing a mixture (2) of radically polymerizable monomers comprising from 10 to 35% by mass of the carboxyl group-containing radically polymerizable unsaturated monomer (b1) and from 65 to 90% by mass of other radically polymerizable unsaturated monomer (b32) in the presence of the aqueous dispersion (I) and water.

(4) The coating composition for cans as described in (1) or (2), wherein the anionic polymer crosslinked fine particles (B) are anionic polymer crosslinked fine particles (B2) obtained by:

radically polymerizing a mixture (3) of radically polymerizable monomers comprising from 20 to 60% by mass of the carboxyl group-containing radically polymerizable unsaturated monomer (b1) and from 40 to 80% by mass of other radically polymerizable unsaturated monomer (b33) to obtain a polymer (I), and emulsion polymerizing a mixture (4) of radically polymerizable monomers comprising from 4 to 33% by mass of the polyvinyl compound (b2) and from 67 to 96% by mass of other radically polymerizable unsaturated monomer (b34) in the presence of the polymer (I) and water.

(5) The coating composition for cans as described in any one of (1) to (4), wherein the polyvinyl compound (b2) is an adduct of an epoxy resin having an epoxy equivalent of from 180 to 1,000 and having at least two epoxy groups in one molecule, and methacrylic acid and/or acrylic acid.

(6) The coating composition for cans as described in any one of (1) to (5), wherein the acrylic resin-modified epoxy resin (A) is a resin obtained by esterifying a bisphenol A type epoxy resin (a1) having a number average molecular weight of from 2,000 to 35,000 and a carboxyl group-containing acrylic resin (a2), or a resin obtained by graft polymerizing a polymerizable unsaturated monomer component comprising a carboxyl group-containing polymerizable unsaturated monomer (a3) onto the bisphenol A type epoxy resin (a1).

(7) The coating composition for cans as descried in any one of (1) to (6), further comprising a resol-type phenolic resin (D) in an amount of from 0.1 to 10 parts by mass per 100 parts by mass of the acrylic resin-modified epoxy resin (A).

(8) The coating composition for cans as described in any one of (1) to (7), which forms a sea-island structure that the acrylic resin-modified epoxy resin (A) forms sea and the anionic polymer crosslinked fine particles (B) form island having a diameter of from 0.01 to 0.5 μm in a cross section of a coating film obtained by applying the coating composition.

According to the invention, a metal can with a coating film having excellent corrosion resistance of contents due to improved bending processability and water whitening resistance, and also having very excellent flavor properties is obtained.

DETAILED DESCRIPTION OF THE INVENTION

Figure 1:
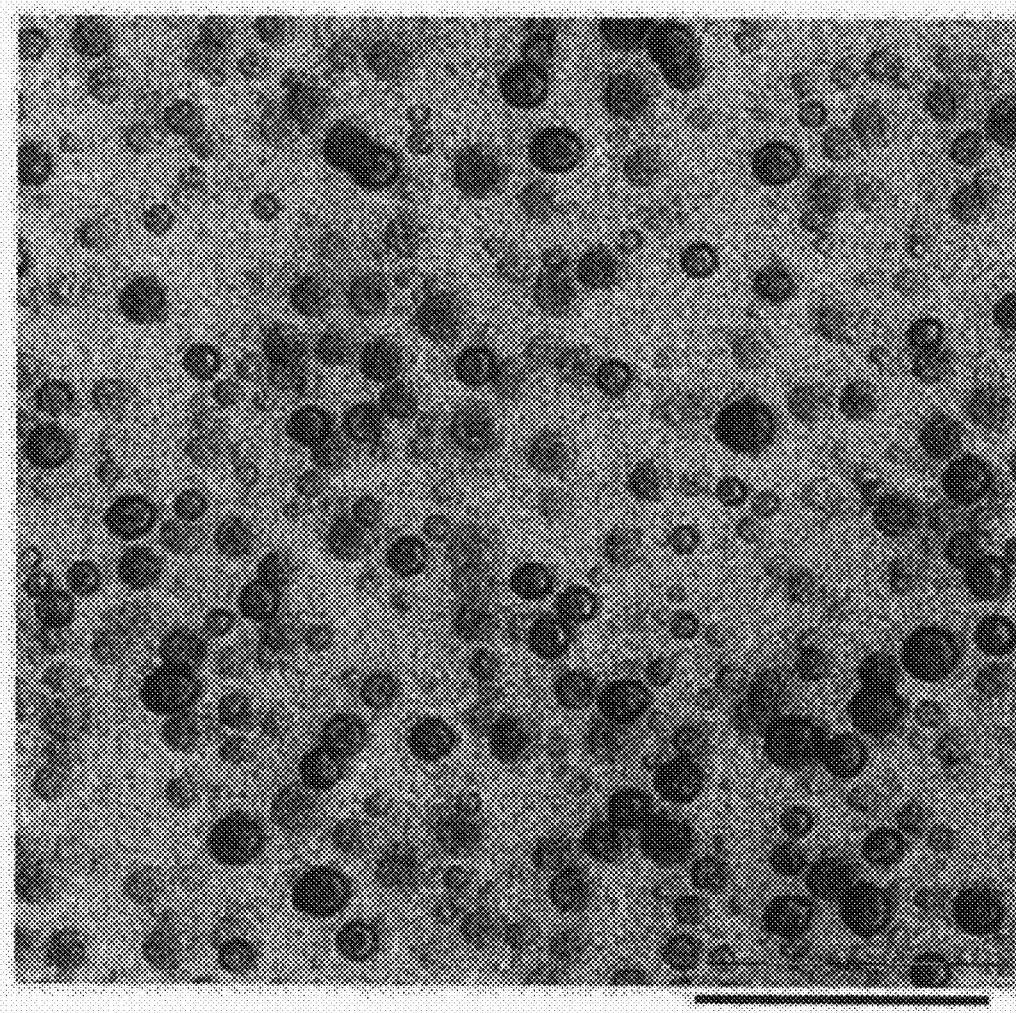
FIG. 1 is a cross sectional view of a coating film having a sea-island structure formed by adding the polymer crosslinked fine particles (B) to a paint.

The coating composition for cans of the invention is described below.

Acrylic Resin-Modified Epoxy Resin (A)

The acrylic resin-modified epoxy resin (A) may be any of the following resin (1) and resin (2).

Resin (1):

A resin obtained by subjecting a bisphenol A type epoxy resin (a1) (hereinafter referred to as an "epoxy resin (a1)" for brevity) and a carboxyl-containing acrylic resin (a2) (hereinafter referred to as an "acrylic resin (a2)" for brevity) to ester addition reaction. In the resin (1), the epoxy resin (a1) and the acrylic resin (a2) can easily be subjected to ester addition reaction by, for example, heating those in an organic solvent solution in the presence of an esterification catalyst.

Resin (2):

A resin obtained by graft polymerizing a polymerizable unsaturated monomer component containing a carboxyl group-containing polymerizable unsaturated monomer (a3) onto a bisphenol A type epoxy resin (a1). In the resin (2), the polymerizable unsaturated monomer component can be graft polymerized onto the epoxy resin (a1), for example, in an organic solvent in the presence of a radical initiator such as benzoyl peroxide.

The bisphenol A type epoxy resin (a1) used in the above resin (1) and resin (2) may be, for example, any of a resin obtained by condensing epichlorohydrin and a bisphenol to a high molecular weight, if necessary, in the presence of a catalyst such as an alkali catalyst; a resin obtained by condensing epichlorohydrin and a bisphenol, if necessary, in the presence of a catalyst such as an alkali catalyst to form a low molecular weight epoxy resin, and subjecting this low molecular weight epoxy resin and a bisphenol to polyaddition reaction; and an epoxy ester resin obtained by reacting a dibasic acid with those resins or the low molecular weight epoxy resin.

Examples of the bisphenol used include bis(4-hydroxyphenyl)methane (bisphenol F), 1,1-bis(4-hydroxyphenyl)ethane, 2,2-bis(4-hydroxyphenyl)propane (bisphenol A), 2,2-bis(4-hydroxyphenyl)butane (bisphenol B), bis(4-hydroxyphenyl)-1,1-isobutane, bis(4-hydroxy-tert-butyl-phenyl)-2,2-propane, p-(4-hydroxyphenyl)phenol, oxybis(4-hydroxyphenyl), sulfonylbis(4-hydroxyphenyl), 4,4'-dihydroxybenzophenone and bis(2-hydroxynaphthyl)methane. Of those, bisphenol F and bisphenol A are preferably used. The bisphenols can be used singly or as mixtures of two or more thereof.

The dibasic acid used in the production of the epoxy ester resin specifically includes succinic acid, adipic acid, pimelic acid, azelaic acid, sebacic acid, dodecanedioic acid and hexahydrophthalic acid.

The commercially available products of the epoxy resin (a1) include Epicoat 1007 (epoxy equivalent: about 1,700, number average molecular weight: about 2,900), Epicoat 1009 (epoxy equivalent: about 3,500, number average molecular weight: about 3,750) and Epicoat 1010 (epoxy equivalent: about 4,500, number average molecular weight: about 5,500), products of Japan Epoxy Resin Co., Ltd.; Araldite AER6099 (epoxy equivalent: about 3,500, number average molecular weight: about 3,800), a product of Asahi Ciba Co., Ltd.; and Epomic R-309 (epoxy equivalent: about 3,500, number average molecular weight: about 3,800), a product of Mitsui Chemicals, Inc.

The epoxy resin (a1) is preferably a bisphenol type epoxy resin having a number average molecular weight in a range of from 2,000 to 35,000, and preferably from 4,000 to 30,000, and an epoxy equivalent in a range of from 1,000 to 12,000, and preferably from 3,000 to 10,000, from corrosion resistance of a coating film obtained.

The number average molecular weight is measured according to JIS K 0124-83. Using four separation columns of TSKGEL 4000HXL, G3000HXL, G2500HXL and G2000HXL (products of Tosoh Corporation), it is obtained from chromatogram obtained by RI refractometer and a calibration curve of a standard polystyrene at 40° C. and a flow rate of 1.0 ml/min using tetrahydrofuran for GPC as an eluting solution.

In the resin (1), a carboxyl group in the acrylic resin (a2) is ester addition reacted with an epoxy group in the epoxy resin (a1) during the ester addition reaction. Therefore, an epoxy resin (a1) is required to have an epoxy group, and the epoxy resin is present in a range of from 0.5 to 2, and preferably from 0.5 to 1.6, on the average per one molecule of the epoxy resin. On the other hand, in the resin (2), a graft reaction occurs by withdrawing hydrogen from an epoxy resin main chain, thereby a graft polymerization reaction proceeds. Therefore, it is sufficient even though an epoxy group is not substantially present in the epoxy resin (a1).

The acrylic resin (a2) used in the resin (1) is a copolymer resin comprising a carboxyl group-containing polymerizable unsaturated monomer (a3) and other copolymerizable unsaturated monomer (a4) as monomer components.

Examples of the carboxyl group-containing polymerizable unsaturated monomer (a3) include monomers such as methacrylic acid, maleic acid, crotonic acid, itaconic acid and fumaric acid. Those can be used singly or as mixtures of two or more thereof.

The other polymerizable unsaturated monomer (a4) can be any monomer that is copolymerizable with the carboxyl group-containing polymerizable unsaturated monomer (a3), and can appropriately be selected according to the performance required. Examples of the other polymerizable unsaturated monomer (a4) include aromatic vinyl monomers such as styrene, vinyltoluene, 2-methylstyrene, t-butylstyrene and chlorostyrene; alkyl esters or cycloalkyl esters, having from 1 to 18 carbon atoms, of acrylic acid or methacrylic acid, such as methyl acrylate, ethyl acrylate, n-propyl acrylate, isopropyl acrylate, n-, i- or t-butyl acrylate, hexyl acrylate, 2-ethylhexyl acrylate, n-octyl acrylate, decyl acrylate, lauryl acrylate, cyclohexyl acrylate, methyl methacrylate, ethyl methacrylate, n-propyl methacrylate, isopropyl methacrylate, n-, i- or t-butyl methacrylate, hexyl methacrylate, 2-ethylhexyl methacrylate, octyl methacrylate, decyl methacrylate, lauryl methacrylate and cyclohexyl methacrylate; $C_2$ to $C_8$ hydroxyalkyl esters of acrylic acid or methacrylic acid, such as 2-hydroxyethyl acrylate, 2-hydroxypropyl acrylate, 3-hydroxypropyl acrylate, hydroxybutyl acrylate, 2-hydroxyethyl methacrylate, 2-hydroxypropyl methacrylate, 3-hydroxypropyl methacrylate and hydroxybutyl methacrylate; N-substituted acrylamide type or N-substituted methacrylamide type monomers such as N-methylol acrylamide, N-butoxymethyl acrylamide, N-methoxymethyl acrylamide, N-methylol methacrylamide and N-butoxymethyl methacrylamide. Those can be used singly or as mixtures of two or more thereof.

The other polymerizable unsaturated monomer (a4) is particularly preferably a mixture of styrene and ethyl acrylate, and the constitutive mass ratio of styrene/ethyl acrylate is in a range of from 99.9/0.1 to 40/60, and preferably from 99/1 to 50/50.

The carboxyl group-containing acrylic resin (a2) is not particularly limited in constitutive proportion of monomers and kind thereof. However, the proportion of the carboxyl group-containing polymerizable unsaturated monomer (a3) is generally from 15 to 60% by mass, and preferably from 20 to 50% by mass, and the proportion of the other polymerizable unsaturated monomer (a4) is generally from 85 to 40% by mass, and preferably from 80 to 50% by mass.

The carboxyl group-containing acrylic resin (a2) can easily be prepared by, for example, conducting a solution polymerization reaction of the above monomer composition in an organic solvent in the presence of a polymerization initiator. The carboxyl group-containing acrylic resin (a2) has a resin acid value in a range of from 100 to 400 mg KOH/g and a number average molecular weight in a range of from 5,000 to 100,000.

The above reaction can be conducted by the conventional method. For example, an esterification catalyst is blended with a uniform organic solvent solution of the epoxy resin (a1) and the acrylic resin (a2), and reaction is conducted until all of epoxy groups are substantially consumed, generally at a reaction temperature of from 60 to 130° C. for about from 1 to 6 hours. Examples of the esterification catalyst include tertiary amines such as triethylamine and dimethylethanol amine, and quaternary salt compounds such as triphenylphosphine. Of those, tertiary amines are preferable.

Solid content concentration in a reaction system of the epoxy resin (a1) and the acrylic resin (a2) is not particularly limited so far as it is within a viscosity range that the reaction system does not impair a reaction. When the esterification catalyst is used in conducting the ester addition reaction, its use amount is generally from 0.1 to 1 equivalent to one equivalent of epoxy group in the epoxy resin (a1).

The content proportion of the epoxy resin (a1) and the acrylic resin (a2) is not particularly limited. However, the proportion of the epoxy resin (a1) is generally from 60 to 90% by mass, and preferably from 70 to 85% by mass, and the proportion of the acrylic resin (a2) is generally from 15 to 30% by mass, and preferably 20% by mass.

When the acrylic resin-modified epoxy resin (A) is a resin comprising the resin (2), the polymerizable unsaturated monomer component to be graft polymerized onto the epoxy resin (a1) can be a polymerizable unsaturated monomer component comprising the carboxyl group-containing polymerizable unsaturated monomer (a3) that is the monomer component used in the production of the carboxyl group-containing polymerizable unsaturated monomer (a2) in the resin (1). The component may further comprise the other polymerizable unsaturated monomer (a4) used in the resin (1).

The graft polymerization reaction in the resin (2) can be conducted by the conventional method. For example, a uniform mixed solution of a radical initiator and the polymerizable unsaturated monomer component is gradually added to an organic solvent solution of the epoxy resin (a1) heated to 80 to 150° C., and the resulting mixture is maintained at the same temperature for from about 1 to 10 hours. Examples of the radical initiator used include azobisisobutyronitrile, benzoyl peroxide, t-butyl perbenzoyl octanoate and t-butyl peroxy-2-ethylhexanoate.

The organic solvent used in preparing the resin (1) and the resin (2) can use the conventional organic solvent so far as it is an organic solvent that dissolves the epoxy resin (a1) and the acrylic resin (a2), or the polymerizable unsaturated monomer component comprising the carboxyl group-containing polymerizable unsaturated monomer (a3), and further does not impair formation of an emulsion in neutralizing and rendering water-borne the acrylic resin-modified epoxy resin (A) which is a reaction product of those.

Specific examples of the organic solvent include isopropanol, butyl alcohol, 2-hydroxy-4-methylpentane, 2-ethylhexyl alcohol, cyclohexanol, ethylene glycol, diethylene glycol, 1,3-butylene glycol, ethylene glycol monoethyl ether, ethylene glycol monobutyl ether, and ethylene glycol monomethyl ether.

The acrylic resin-modified epoxy resin (A) obtained from the resin (1) or the resin (2) has a carboxyl group, and preferably has a resin acid value in a range of from 10 to 160 mg KOH/g, and preferably from 20 to 100 mg KOH/g, from the standpoints of water dispersibility, coating film performances and the like.

The acrylic resin-modified epoxy resin (A) can be dispersible in an aqueous medium by neutralizing at least part of the carboxyl group in the resin with a basic compound.

Amines and ammonia are preferably used as the basic compound used for the neutralization of the carboxyl group. Representative examples of the amines include alkylamines such as trimethylamine, triethylamine and tributylamine; alkanolamines such as dimethyl ethanolamine, diethanolamine and aminomethyl propanol; and cyclic amines such as morpholine. The degree of neutralization of the acrylic resin-modified epoxy resin (A) is not particularly limited, but is preferably in a range of from 0.1 to 2.0 equivalent neutralization to the carboxyl group in the resin (A).

The aqueous medium may be water alone, but may be a mixture of water and an organic solvent. The organic solvent can use any of the conventional organic solvents, and organic solvents described as the organic solvents that can be used in the production of the acrylic resin-modified epoxy resin (A) can suitably be used. The amount of the organic solvent in the coating composition for cans of the invention is desirably in a range of 20% by mass or less based on the mass of the resin solid content of the coating composition for cans from the standpoint of environmental protection and the like.

The acrylic resin-modified epoxy resin (A) can be neutralized and dispersed in an aqueous medium by the conventional method. For example, a method of gradually adding the acrylic resin-modified epoxy resin (A) to an aqueous medium containing a basic acid as a neutralizing agent under stirring; a method of neutralizing the acrylic resin-modified epoxy resin (A) with a basic compound, and then adding an aqueous medium to the neutralized product or adding the neutralized product to an aqueous medium, under stirring; and the like can be used.

Anionic Polymer Crosslinked Fine Particles (B)

The anionic polymer crosslinked fine particles (B) in the invention comprise a polymer obtained from radically polymerizable unsaturated monomers comprising a carboxyl group-containing radically polymerizable unsaturated monomer (b1), a polyvinyl compound (b2) and other radically polymerizable unsaturated monomer (b3). In the polymer, the content of the carboxyl group-containing radically polymerizable unsaturated monomer (b1) is from 2 to 30% by mass, and preferably from 5 to 15% by mass, the content of the polyvinyl compound (b2) is from 2 to 30% by mass, and preferably from 5 to 15% by mass, and the content of the other radically polymerizable unsaturated monomer (b3) is from 40 to 96% by mass, and preferably from 70 to 90% by mass, all based on the mass of the total solid content of the constitutive radically polymerizable monomers.

Where the content of the carboxyl group-containing radically polymerizable unsaturated monomer (b1) is less than 2% by mass, water dispersibility becomes insufficient, and where it exceeds 30% by mass, corrosion resistance may deteriorate. Where the content of the polyvinyl compound is less than 2% by mass, water whitening resistance becomes insufficient, and where it exceeds 30% by mass, a particle size increases, which are not preferable.

Examples of the carboxyl group-containing radically polymerizable unsaturated monomer (b1) include monomers such as methacrylic acid, maleic acid, crotonic acid, itaconic acid and fumaric acid. Those can be used singly or as mixtures of two or more thereof.

Examples of the polyvinyl compound (b2) include divinylbenzene, ethylene glycol dimethacrylate, diethylene glycol dimethacrylate, triethylene glycol dimethacrylate, tetraethylene glycol dimethacrylate, 1,3-butylene glycol dimethacrylate, 1,4-butanediol diacrylate, glycerin dimethacrylate, glycerin trimethacrylate, trimethylolpropane dimethacrylate, trimethylolpropane trimethacrylate, pentaerythritol dimethacrylate, pentaerythritol trimethacrylate, pentaerythritol tetramethacrylate, dipentaerythritol pentamethacrylate, neopentyl glycol diacrylate, 1,6-hexanediol diacrylate, glycerol allyloxydimethacrylate, 1,1,1-tris(hydroxymethyl) ethane dimethacrylate and 1,1,1-tris(hydroxymethyl)ethane trimethacrylate. The polyvinyl compound (b2) can appropriately be selected from those and used.

The polyvinyl compound (b2) can further use an adduct obtained by reacting an epoxy resin having an epoxy equivalent of from 180 to 1,000 and having at least two epoxy groups in one molecule, with methacrylic acid and/or acrylic acid. In detail, it is an adduct obtained by addition reacting 1 mole of the functional group in the epoxy resin with from 0.5 to 0.98 mole, preferably from 0.65 to 0.95 mole, and more preferably from 0.75 to 0.9 mole, of methacrylic acid and/or acrylic acid at a reaction temperature of from 60 to 150° C. for from 10 to 180 minutes.

Examples of the other radically polymerizable unsaturated monomer (b3) include vinyl aromatic compounds such as styrene, α-methylstyrene, vinyltoluene, p-chlorostyrene and vinyl pyridine; hydroxyl group-containing radically polymerizable unsaturated monomers such as $C_2$-$C_8$ hydroxyalkyl methacrylate of acrylic acid or methacrylic acid (for example, 2-hydroxyethyl methacrylate, 3-hydroxypropyl methacrylate and 4-hydroxybutyl methacrylate), (poly)ethylene glycol monomethacrylate, polypropylene glycol monomethacrylate and polybutylene glycol monomethacrylate; reaction products between those hydroxyl group-containing radically polymerizable unsaturated monomers and lactone compounds (for example, β-propiolactone, dimethyl propiolactone, butyrolactone, γ-valerolactone, γ-caprolactone, γ-caprylolactone, γ-laurylolactone, ε-caprolactone and δ-caprolactone), such as PLAXEL FM-1, PLAXEL FM-2, PLAXEL FM-3, PLAXEL FA-1, PLAXEL FA-2 and PLAXEL FA-3 (all trade names, products of Daicel Chemical Industries, Ltd., caprolactone-modified methacrylic acid hydroxyesters); $C_1$-$C_{18}$ alkyl- or cycloalkyl esters of methacrylic acid, such as methyl methacrylate, ethyl methacrylate, propyl methacrylate, butyl methacrylate, hexyl methacrylate, octyl methacrylate, lauryl methacrylate and cyclohexyl methacrylate; nitrogen-containing radically polymerizable unsaturated monomers such as N-(2-hydroxyethyl)methacrylamide, N-(2-hydroxypropyl)methacrylamide, N-(3-hydroxypropyl)methacrylamide, N-methyl-N-(2-hydroxyethyl)methacrylamide, N-ethyl-N-(2-hydroxyethyl) methacrylamide, N-methyl-N-(2-hydroxypropyl) methacrylamide, N-methyl-N-(3-hydroxypropyl) methacrylamide, N-ethyl-N-(2-hydroxypropyl) methacrylamide, N-ethyl-N-(3-hydroxypropyl) methacrylamide, N,N-di-(2-hydroxyethyl)methacrylamide and N,N-di-(2-hydroxypropyl)methacrylamide; and alkoxysilyl group-containing radically polymerizable unsaturated monomers such as vinyl trimethoxysilane, vinylmethyl dimethoxysilane, vinyldimethyl methoxysilane, vinyl triethoxysilane, vinylmethyl diethoxysilane, vinyldimethyl ethoxysilane, vinyl tripropoxysilane, vinylmethyl dipropoxysilane, vinyldimethyl propoxysilane, γ-methacryloyloxypropyl trimethoxysilane, γ-methacryloyloxypropylmethyl dimethoxysilane and γ-methacryloyloxypropyl dimethylmethoxysilane.

The anionic polymer crosslinked fine particles (B) comprises a polymer produced by polymerizing the above-described each radically polymerizable unsaturated monomer in the presence of water.

Polymerization reaction can be conducted by appropriately adding a polymerization initiator generally in water at a temperature of from about 60 to about 95° C., and preferably from about 75 to about 85° C., for about from 1 to 5 hours, and preferably from 2 to 4 hours.

Examples of the polymerization initiator that can be used include ammonium persulfate, potassium persulfate and sodium persulfate, and the amount added is from 0.05 to 3% by mass, and preferably from 0.1 to 1.0% by mass.

The anionic polymer crosslinked fine particles (B) obtained have an acid value of from 10 to 120 mg KOH/g, preferably from 40 to 100 mg KOH/g, and more preferably from 60 to 85 mg KOH/g, and have an average particle size of from 0.05 to 1.0 µm, preferably from 0.10 to 0.5 µm, and more preferably from 0.10 to 0.30 µm. Fine particles satisfying the above ranges of the acid value and the average particle size are preferable for the formation of a coating film having high transparency. Further preferable embodiments of the anionic polymer crosslinked fine particles (B) include the following anionic polymer crosslinked fine particles (B1) and anionic polymer crosslinked fine particles (B2).

The average particle size can be measured with Submicron Particle Analyzer N4 (a product of Beckman Coulter, particle size distribution measurement device) at ordinary temperature (about 20° C.) by diluting a sample with deionized water to a concentration suitable for measurement.

Anionic Polymer Crosslinked Particles (B1)

A mixture (1) of radically polymerizable monomers comprising 5% by mass or less, and preferably 3% by mass or less, of the carboxyl group-containing radically polymerizable unsaturated monomer (b1); from 4 to 35% by mass, and preferably from 10 to 25% by mass, of the polyvinyl compound (b2); and from 60 to 96% by mass, and preferably from 75 to 90% by mass, of the other radically polymerizable unsaturated monomer (b31) is emulsion polymerized in the presence of water (first step) to obtain an aqueous dispersion (I).

The carboxyl group-containing radically polymerizable unsaturated monomer (b1) and the polyvinyl compound (b2) used in the mixture (1) can use the same materials used in the production of the anionic polymer crosslinked fine particles (B). The other radically polymerizable unsaturated monomer (b31) can use the radically polymerizable unsaturated monomer (b3) used in the production of the anionic polymer crosslinked fine particles (B).

The mixture (1) of radically polymerizable monomers comprising the above-described carboxyl group-containing radically polymerizable unsaturated monomer (b1), polyvinyl compound (b2) and other radically polymerizable unsaturated monomer (b31) is emulsion polymerized using an emulsifier, thereby producing the aqueous dispersion (I). In such a case, the reaction temperature is generally from about 60 to 90° C., and preferably from about 75 to 85° C., and the reaction time is generally 10 hours or less, and preferably from about 0.5 to about 6 hours.

A mixture (2) of radically polymerizable monomers comprising the carboxyl group-containing radically polymerizable unsaturated monomer (b1) in an mount of from 10 to 35% by mass, and preferably from 15 to 25% by mass, and other radically polymerizable unsaturated monomer (b32) in an amount of from 65 to 90% by mass, and preferably from 75 to 85% by mass, is emulsion polymerized using a polymerization initiator and an emulsifier (second step) to obtain anionic polymer-crosslinked fine particles (B1).

The carboxyl group-containing radically polymerizable unsaturated monomer (b1) used in the mixture (2) can be selected from at least one of the same monomers used in the mixture (1). The other radically polymerizable unsaturated monomer (b32) used in the mixture (2) can be selected from at least one of the polyvinyl compound (b2) and the other radically polymerizable unsaturated monomer (b31) used in the emulsion polymerization reaction of the first step.

The mass ratio of the aqueous dispersion (1) to the mixture (2) in using for the production of the anionic polymer crosslinked fine particles (B1) can be adjusted in a range of aqueous dispersion (I)/mixture (2)=50/50 to 90/10 (mass ratio), and preferably 70/30 to 85/15 (mass ratio), on the basis of the sum of the aqueous dispersion (1) and the mixture (2).

The polymerization initiator can use ammonium persulfate, potassium persulfate and sodium persulfate, and its amount used is from 0.05 to 3% by mass, and preferably from 0.1 to 1.0% by mass.

Examples of the emulsifier used in the emulsion polymerization reaction of the first step and the emulsion polymerization reaction of the second step include sodium salts and ammonium salts of an alkylsulfonic acid, an alkylbenzenesulfonic acid, alkylphosphoric acid and the like, and further include nonionic anionic emulsifiers having an anionic group and a nonionic group such as a polyoxyethylene or polyoxypropylene chain, in one molecule, and reactive anionic emulsifiers having an anionic group and a polymerizable unsaturated group in one molecule.

Examples of the emulsifier specifically include nonionic emulsifiers such as polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan trioleate and polyoxyethylene sorbitan monolaurate; and ampholytic emulsifiers such as dimethyl alkyl bedains, dimethyl alkyl lauryl bedains and alkyl glycines.

The concentration of the emulsifier is from about 0.1 to 20% by mass, and preferably from about 0.5 to 10% by mass, based on the mass of the sum of the monomers constituting the mixture (1) or the mixture (2), from the standpoint of coating film performances. Polymerization reaction subsequent to the first step and the second step can generally be conducted in water at a temperature of from about 60 to 95° C., and preferably from about 75 to 85° C. for from about 1 to 5 hours, and preferably from about 2 to 4 hours.

The anionic polymer crosslinked fine particles (B1) obtained have an acid value of from 1 to 120 mg KOH/g, preferably from 20 to 80 mg KOH/g, and more preferably from 40 to 75 mg KOH/g, and an average particle size of from 0.1 to 0.5 μm, preferably from 0.10 to 0.35 μm, and more preferably from 0.10 to 0.25 μm. Those ranges are preferable for the formation of a coating film having excellent drawing and ironing processability and water whitening resistance.

The average particle size can be measured with Submicron Particle Analyzer N4 (a product of Beckman Coulter, particle size distribution measurement device) at ordinary temperature (about 20° C.) by diluting a sample with deionized water to a concentration suitable for measurement.

Anionic Polymer-Crosslinked-Fine Particles (B2)

A mixture (3) of radically polymerizable monomers comprising the carboxyl group-containing radically polymerizable unsaturated monomer (b1) in an amount of from 20 to 60% by mass, and preferably from 35 to 55% by mass, and other radically polymerizable unsaturated monomer (b33) is radically polymerized to obtain the polymer (I).

In the production of the polymer (I), the carboxyl group-containing radically polymerizable unsaturated monomer (b1) used in the mixture (3) can use the same carboxyl group-containing radically polymerizable unsaturated monomer (b1) used in the production of the anionic polymer crosslinked fine particles (B1), and examples thereof include monomers such as methacrylic acid, maleic acid, crotonic acid, itaconic acid and fumaric acid. Those can be used singly or as mixtures of two or more thereof. The other radically polymerizable unsaturated monomer (b33) used can be selected from at least one of the polyvinyl compound (b2) and the other radically polymerizable unsaturated monomer (b31), used in the production of the anionic polymer crosslinked fine particles (B1).

The radical polymerization reaction using the mixture (3) can be conducted using a polymerization initiator in an appropriate solvent at a temperature of from about 90 to about 170° C., and preferably from about 100 to about 150° C., for from about 1 to 5 hours, and preferably from about 2 to 4 hours, to obtain the polymer (I).

Examples of the solvent used the reaction include hydrocarbon type solvents such as toluene, xylene, cyclohexane and n-hexane; ester type solvents such as methyl acetate, ethyl acetate and butyl acetate; ketone type solvents such as acetone, methyl ethyl ketone, methyl isobutyl ketone and methyl amyl ketone; amide type solvents such as dimethylformamide and dimethylacetamide; alcohol type solvents such as methanol, ethanol, n-propanol and iso-propanol; and mixtures of those.

The polymerization initiator can use azobisisobutyronitrile (ALBN), t-butylperoxy-2-ethyl hexanoate (perbutyl O) and the like. The concentration of the polymerization initiator is from 0.05 to 3% by mass, and preferably from 0.1 to 1.0% by mass, based on the mass of the sum of the monomers constituting the mixture (3).

A mixture (4) comprising the polyvinyl compound (b2) in an amount of from 4 to 33% by mass, and preferably from 5 to 25% by mass, and other radically polymerizable unsaturated monomer (b34) in an amount of from 67 to 96% by mass, and preferably from 75 to 90% by mass, is emulsion polymerized in the presence of the polymer (I) and water to obtain the anionic polymer crosslinked fine particles (B2).

The polyvinyl compound (b2) used can be selected from at least one of the same monomers used in the production of the anionic polymer crosslinked fine particles (B1). The other radically polymerizable unsaturated monomer (b34) used can be selected from at least one of the other radically polymerizable unsaturated monomer (b31) and the carboxyl group-containing radically polymerizable unsaturated monomer (b1).

The mass ratio of the polymer (I) to the mixture (4) in using for the production of the anionic polymer-crosslinked fine particles (B2) can be adjusted in a range of polymer (I)/mixture (1)=25/75 to 85/15 (mass ratio), and preferably 60/40 to 80/20 (mass ratio), on the basis of the sum of the polymer (I) and the mixture (4).

In the emulsion polymerization reaction, an polymerization initiator such as ammonium persulfate, potassium persulfate and sodium persulfate; azobisisobutyronitrile (AIBN), t-butylperoxy-2-ethyl hexanoate (perbutyl O) and a redox type polymerization initiator can be used. The concentration of the polymerization initiator is from 0.05 to 3% by mass, and preferably from 0.1 to 10% by mass, based on the mass of the sum of the monomers constituting the polymer (I).

The emulsifier can use the same emulsifier used in the production of the anionic polymer crosslinked fine particles (B1), and examples thereof include sodium salts and ammonium salts of alkylsulfonic acid, alkylbenzenesulfonic acid, alkylphosphoric acid and the like. The concentration of the emulsifier is from about 0.3 to 3% by mass, and preferably from about 0.5 to 2% by mass, based on the mass of the sum of the monomers constituting the mixture (3) or the polymer (I) from the standpoint of coating film performances. Further, formation of particles can be conducted without using the emulsifier by selecting conditions. In the emulsion polymerization reaction, the reaction temperature is in a range of generally from about 60 to 95° C., and preferably from about 75 to 85° C., and the reaction time is generally about 10 hours or less, and preferably from about 0.5 to about 6 hours.

The anionic polymer crosslinked fine particles (B2) obtained have an acid value of from 10 to 120 mg KOH/g, preferably from 30 to 100 mg KOH/g, and more preferably from 50 to 90 mg KOH/g, and an average particle size of from 0.05 to 1.0 μm, preferably from 0.10 to 0.50 μm, and more preferably from 0.10 to 0.30 μm. Those ranges are preferable for the formation of a coating film having excellent drawing processability and water whitening resistance.

When the coating composition for cans of the invention contains the anionic polymer-crosslinked fine particles (B1) or the anionic polymer-crosslinked fine particles (B2), such a coating composition provides a coating film having excellent balance in bending processability, water whitening resistance and flavor properties.

The amount of the anionic polymer crosslinked fine particles (B1) or the anionic polymer crosslinked fine particles (B2) contained in the coating composition for cans of the invention is in a range of from 1 to 50 parts by mass, and preferably from 5 to 30 parts by mass, per 100 parts by mass of the acrylic resin-modified epoxy resin (A). When the amount is fallen within the above range, bending processability, water whitening resistance, flavor properties, paint stability and the like of a coating film are improved, which is preferable.

Alkali Thickening Agent (C)

The coating composition for cans of the invention preferably contains an alkali thickening agent (C) in addition to the acrylic resin-modified epoxy resin (A) and the anionic polymer crosslinked fine particles (B). When the coating composition contains the alkali thickening agent (C), sag resistance of a coating film obtained from such a coating composition can be improved. The content of the alkali thickening agent (C) is from 0.1 to 10 parts by mass, preferably from 0.5 to 5 parts by mass, and more preferably from 1 to 3 parts by mass, per 100 parts by mass of the acrylic resin-modified epoxy resin (A).

The alkali thickening agent (C) is an emulsion polymer produced by polymerizing radically polymerizable unsaturated monomers comprising from 10 to 60% by mass of a carboxyl group-containing radically polymerizable unsaturated monomer (c1), 1% by mass or less of a polyvinyl compound (c2) and from 39 to 90% by mass of other radically polymerizable unsaturated monomer (c3) in the presence of water.

Examples of the carboxyl group-containing radically polymerizable unsaturated monomer (c1) used include monoesters of acrylic acid or methacrylic acid and monoalcohols having from 1 to 24 carbon atoms, such as ethyl acrylate, 2-ethylhexyl acrylate, methyl methacrylate, ethyl methacrylate, propyl methacrylate, n-butyl methacrylate, isobutyl methacrylate, pentyl methacrylate, hexyl methacrylate, 2-ethylhexyl methacrylate, cyclohexyl methacrylate and lauryl methacrylate; glycidyl methacrylate, acrylonitrile, acrylamide, N-methyl acrylamide, N-methylol acrylamide, N-butoxymethyl acrylamide, phenylethyl methacrylate, vinyl acetate, vinyl chloride, acrylic acid, methacrylic acid, hydroxyethyl methacrylate and hydroxypropyl methacrylate. Those can be used singly or as mixtures of two or more thereof. Of those, methyl methacrylate, ethyl acrylate, 2-ethylhexyl acrylate, acrylic acid and methacrylic acid are preferably used from the point of food hygiene.

The polyvinyl compound (2c) has at least two polymerizable unsaturated bonds in one molecule, and examples thereof include allyl methacrylate, ethylene glycol dimethacrylate, triethylene glycol dimethacrylate, tetraethylene glycol dimethacrylate, 1,3-butylene glycol dimethacrylate, trimethylolpropane trimethacrylate, 1,4-butanediol dimethacrylate, neopentyl glycol dimethacrylate, 1,6-hexanediol dimethacrylate, pentaerythritol dimethacrylate, pentaerythritol tetramethacrylate, glycerol dimethacrylate, 1,1,1-trishydroxymethylethane dimethacrylate, 1,1,1-trishydroxymethylethane trimethacrylate, 1,1,1-trishydroxymethylpropane trimethacrylate, triallyl isocyanurate, diallyl terephthalate and divinylbenzene. The polyvinyl compound (2c) is suitably used to increase a molecular weight of the alkali thickening agent (C).

The other radically polymerizable unsaturated monomer (c3) can use the same monomers as the other radically polymerizable unsaturated monomer (b3).

In polymerization reaction using a mixture of those radically polymerizable unsaturated monomers, an emulsifier can appropriately be added. Examples of the emulsifier used include sodium salts and ammonium salts of an alkylsulfonic acid, an alkylbenzenesulfonic acid, an alkylphosphoric acid and the like, and further include nonionic anionic emulsifiers having those anionic groups and nonionic groups such as polyoxyethylene or polyoxypropylene chain in one molecule, and reactive anionic emulsifiers having those anionic groups and a polymerizable unsaturated group in one molecule.

A polymerization initiator may appropriately be added. Examples of the polymerization initiator include ammonium persulfate and 4,4'-azobis(4-cyanobutanoic acid). The concentration of the polymerization initiator is in a range of from 0.01 to 10% by mass, and preferably from 0.01 to 5% by mass, based on the mass of the entire polymerizable unsaturated monomers used in an inner layer component when the inner layer component is polymerized. When polymerization of an outer layer is conducted, the concentration is from 0.01 to 5% by mass, and preferably from 0.01 to 1.0% by mass, based on the mass of the entire polymerizable unsaturated monomers used in the outer layer component.

The alkali thickening agent (C) can use a core-shell type emulsion polymer. In this case, weight ratio in the content between the core component and the shell component is that, for example, in the case of the two step polymerization, from the points of ease of synthesis, smoothness of a coating film and sag resistance, the component in the first step is from 99 to 20% by mass, and preferably from 90 to 50% by mass, and the component in the second step is from 1 to 80% by mass, and preferably from 10 to 50% by mass, in the point of securing paint stability.

The alkali thickening agent (C) has an acid value in a range of from 50 to 500 mg KOH/g, and preferably from 150 to 300 mg KOH/g. Where the acid value is less than 50 mg KOH/g, sag resistance of a coating film is not sufficient, and on the other hand, where the acid value exceeds 500 mg KOH/g, water resistance deteriorates.

Examples of commercially available products of such an alkali thickening agent (C) include PRIMAL ASE-60 (a product of Rohm and Haas Company), YODOSOL KA-10K (a product of Nippon NSC), THIXOL K-130B (a product of Kyoeisha Chemical Co., Ltd.) and VISCALEX HV-30 (a product of Ciba Geigy).

Resol Type Phenolic Resin (D)

The coating composition for cans of the invention can further appropriately contain a resol type phenolic resin (D) in addition to the acrylic resin-modified epoxy resin (A) and the anionic polymer crosslinked fine particles (B). Use of the resol type phenolic resin (D) enables a coating film having excellent coating film performances such as adhesion to form.

The resol type phenolic resin (D) acts as a crosslinking agent of the acrylic resin-modified epoxy resin (A), and includes a phenolic resin having a methylol group introduced therein, obtained by condensation reacting phenols such as phenol and bisphenol A and aldehydes such as formaldehyde in the presence of a reaction catalyst, and a phenolic resin wherein part of the methylol group introduced is alkyl esterified with an alcohol having 6 or less carbon atoms.

The resol type phenolic resin (D) has a number average molecular weight in a range of from 200 to 2,000, and preferably from 300 to 1,200, and an average number of methylol group per one benzene nucleus in a range of from 0.3 to 3, preferably from 0.5 to 3.0, and more preferably from 0.7 to 3.0.

In the coating composition for cans of the invention, the content of the resol type phenolic resin is in a range of from 0.1 to 10 parts by mass, and preferably from 0.1 to 5 parts by mass, per 100 parts by mass of the solid content of the acrylic resin-modified epoxy resin (A). Further, if required and necessary, the coating composition may further appropriately contain surfactants, defoaming agents, pigments, waxes, perfumes and the like.

The coating composition for cans of the invention can be applied to various substrates. Examples of the substrate include non-treated metal plates or surface-treated metal plates, such as an aluminum plate, a steel plate and a tin plate; metal plates of those metal plates having applied thereto an epoxy type or vinyl type primer; and cans processed from those metal plates.

A method of coating the substrate with the coating composition for cans can apply conventional various methods such as roll coater coating, spray coating, immersion coating and electrodeposition coating. Of those, roll coater coating and spray coating are preferably used. Thickness of the coating film can appropriately be determined depending on the purpose of use, but is generally from about 3 to 20 μm. Drying conditions of the coating film applied are conditions that generally the maximum achievable temperature of a material is from 120 to 300° C., and drying time is from 10 seconds to 30 minutes, and preferably the maximum achievable temperature of a material is from 200 to 280° C., and drying time is from 15 seconds to 10 minutes.

Cross section of the coating film obtained by applying the coating composition for cans is characterized by the formation of a sea-island structure (see FIG. 1) having a diameter of from 0.01 to 0.5 μm, preferably from 0.05 to 0.35 μm, and more preferably from 0.08 to 0.15 μm. It is considered that the formation of such a sea-island structure contributes to the improvement of bending processability.

The present invention will be illustrated in greater detail with reference to the following Examples, but the invention should not be construed as being limited thereto.

Production Example 1

Production of Epoxy Resin (a1) Solution 558 parts by mass of Epicoat 828EL (a product of Japan Epoxy Resin Co., Ltd., epoxy equivalent: about 190, molecular weight: about 350), 329 parts by mass of bisphenol A and 0.6 part by mass of tetrabutylammonium bromide were charged in a four-necked flask equipped with a reflux tube, a thermometer and a stirrer, and polymerization reaction was conducted at 160° C. under nitrogen stream. The reaction was followed by an epoxy equivalent, and conducted for about 5 hours to obtain a bisphenol A type epoxy resin (a1) having a number average molecular weight of about 11,000 and an epoxy equivalent of about 8,000.

Production Example 2

Production of Carboxyl Group-Containing Acrylic Resin (a2) Solution 882 parts by mass of n-butanol was charged in a four-necked flask equipped with a reflux tube, a thermometer, a dropping funnel and a stirrer. A mixture of 180 parts by mass of methacrylic acid, 240 parts by mass of styrene, 180 parts by mass of ethyl acrylate and 18 parts by mass of t-butylperoxy-2-ethylhexanoate was heated to 100° C. under nitrogen stream, and was added dropwise to the flask from the dropping funnel over 3 hours. After the dropwise addition, the resulting mixture was stirred at the same temperature for 2 hours and then cooled to obtain an acrylic resin solution having a solid content of 40% by mass. A resin (solid content)

thus obtained had a resin acid value of 196 mg KOH/g and a number average molecular weight of about 19,000.

Production Example 3

Production of Acryl-Modified Epoxy Resin (A) Dispersion 80 parts by mass (solid content) of the bisphenol A type epoxy resin (a1) obtained in Production Example 1, 50 parts by mass (solid content: 20 parts by mass) of the 40 mass % acrylic resin (a2) solution obtained in Production Example 2 and 33 parts by mass of diethylene glycol monobutyl ether were added to a four-necked flask equipped with a reflux tube, a thermometer and a stirrer, and dissolved by heating at 100° C. 2 parts by mass of N,N-dimethylaminoethanol was added, and reaction was conducted for about 2 hours. 3 parts by mass of N,N-dimethylaminoethanol was added, and reaction was continued for 20 minutes. 165 parts by mass of deionized water was added dropwise over 1 hour to conduct water dispersing, thereby obtaining an acryl-modified epoxy resin (A) dispersion having an acid value of 34 mg KOH/g and a solid content of 30% by mass.

Production Example 4

Production of Resol Type Phenolic Resin (D) Solution 188 parts by mass of phenol and 324 parts by mass of a 37 mass % formaldehyde aqueous solution were charged in a flask, and the contents were uniformly dissolved by heating to 50° C. Zinc acetate was added to the flask, followed by mixing to adjust pH in the system to 5.0. The system was heated to 90° C. and reaction was conducted for 5 hours. The system was cooled to 50° C., a 32 mass % calcium oxide aqueous dispersion was gradually added to adjust pH to 8.5, and reaction was conducted at 50° C. for 4 hours. After completion of the reaction, pH was adjusted to 4.5 with 20 mass % hydrochloric acid. A resin component was extracted with a mixed solvent of xylene/n-butanol/cyclohexane=1/2/1 (mass ratio) to remove a catalyst and a neutralized salt, and azeotropic dehydration was conducted under reduced pressure to obtain a pale yellow transparent phenolic resin (D) solution having a non-volatile content of 60% by mass.

Production Examples 5-1 to 5-4

Production of Anionic Polymer Crosslinked Fine Particles (B)

Production Example 5-1

150 parts by mass of deionized water and 0.5 part by mass (solid content) of Newcol 562SF were charged in a reaction vessel equipped with a thermometer, a thermostat, a stirrer, a reflux condenser and a dropping device, and mixed by stirring under nitrogen stream, and temperature was elevated to 85° C.

1% by mass in the following monomer mixture 1 and 5.2 parts by mass of a 3 mass % ammonium persulfate aqueous solution were introduced into the reaction vessel and maintained at 85° C. for 20 minutes. The remaining monomer emulsion and ammonium persulfate aqueous solution were added dropwise to the reactor with a metering pump over 3 hours, and after completion of the dropwise addition, aging was conducted for 2 hours. The mixture in the reactor was cooled to 30° C., filtered with 100 mesh nylon cloth and discharged to obtain anionic polymer crosslinked fine particles B-1. The fine particles B-1 had an average particle size of 0.1 μm, a solid content of 25% by mass and an acid value of 65 mg KOH/g.

Monomer Mixture 1:

| Deionized water | 135 parts by mass |
| Styrene | 30 parts by mass |
| Ethyl acrylate | 50 parts by mass |
| Methacrylic acid | 10 parts by mass |
| Ethylene glycol dimethacrylate | 10 parts by mass |

Ammonium Persulfate Aqueous Solution:

| Ammonium persulfate | 0.2 part by mass |
| Deionized water | 10 parts by mass |
| Newcol 562SF | 1 part by mass (solid content) |

Newcol 562SF: a product of Nippon Nyukazai Co., Ltd., trade name, ammonium polyoxylethylene alkylbenzene sulfonate, effective component: 60% by mass)

Newcol 562SF: a product of Nippon Nyukazai Co., Ltd., trade name, ammonium polyoxylethylene alkylbenzene sulfonate, effective component: 60% by mass)

Production Examples 5-2 TO 5-4

Anionic polymer crosslinked fine particles B-2 to B-4 were obtained in the same manner as in Production Example 5-1, except for changing the formulation to the respective formulation shown in Table 1.

Comparative Production Examples 5-1 to 5-4

Fine particles B'-1 to B'-4 were obtained in the same manner as in Production Example 5-1, except for changing the formulation to the respective formulation shown in Table 1.

Production Examples 6-1 And 6-2

Production of Anionic Polymer Crosslinked Fine Particles (B1)

Production Example 6-1

Core-Shell Type 115 parts by mass of deionized water and 0.5 part by mass (solid content) of Newcol 562SF were charged in a reaction vessel equipped with a thermometer, a thermostat, a stirrer, a reflux condenser and a dropping device, and mixed by stirring under nitrogen stream, and temperature was elevated to 85° C.

1% by mass in the following monomer mixture 1 and 3.3 parts by mass of an ammonium persulfate aqueous solution having the following composition were introduced into the reaction vessel and maintained at 85° C. for 20 minutes. The remaining monomer emulsion was added dropwise to the reactor with a metering pump over 2 hours, and after completion of the dropwise addition, aging was conducted for 1 hour to obtain an aqueous dispersion (I).

The following monomer mixture 2 and an ammonium persulfate aqueous solution having the following composition were added dropwise, and aging was conducted for 2 hours. The mixture in the reactor was cooled to 30° C., filtered with 100 mesh nylon cloth and discharged to obtain anionic polymer crosslinked fine particles B1-1 having an average particle size of 0.12 am, a solid content of 30% by mass and an acid value of 29 mg KOH/g.

Monomer Mixture 1:

| | |
|---|---|
| Deionized water | 70 parts by mass |
| Styrene | 23 parts by mass |
| Ethyl acrylate | 40 parts by mass |
| Ethylene glycol dimethacrylate | 7 parts by mass |
| Newcol 562SF | 1 part by mass (solid content) |

Monomer Mixture 2 (Shell):

| | |
|---|---|
| Deionized water | 30 parts by mass |
| Styrene | 9 parts by mass |
| Ethyl acrylate | 16.5 parts by mass |
| Methacrylic acid | 4.5 parts by mass |
| Newcol 562SF | 0.5 part by mass (solid content) |

Ammonium Persulfate Aqueous Solution:

| | |
|---|---|
| Ammonium persulfate | 0.5 part by mass |
| Deionized water | 10 parts by mass |

Production Example 6-2

Core-Shell Type

Anionic polymer-crosslinked fine particles B1-2 were obtained in the same manner as in Production Example 5-1, except for changing the formulation to the formulation shown in Table 1.

Comparative Production Examples 6-1 and 6-2

Core-Shell Type

Fine particles B1'-1 and B1'-2 were obtained in the same manner as in Production Example 5-1, except for changing the formulation to the respective formulation shown in Table 1.

TABLE 1

| | | | Production Example 5-1 | Production Example 5-2 | Production Example 5-3 | Production Example 5-4 | Production Example 6-1 | Production Example 6-2 |
|---|---|---|---|---|---|---|---|---|
| Anionic polymer fine particles | | | B-1 | B-2 | B-3 | B-4 | B1-1 | B1-2 |
| Formulation | b1 | Methacrylic acid | 10 | 15 | 10 | 10 | | |
| | | Methyl methacrylate | | | 10 | 10 | | |
| | | Ethyl acrylate | 50 | 45 | 45 | 50 | 40 | 30 |
| | b2 | Ethylene glycol dimethacrylate | 10 | 10 | 5 | | 7 | 10 |
| | | Divinylbenzene | | | | 10 | | |
| | b3 | Styrene | 30 | 30 | 30 | 20 | 23 | 30 |
| | | Newcol 562SF | 1.5 | 1.5 | 1.5 | 1.5 | 1.0 | 1.0 |
| | | Deionized water | 300 | 300 | 300 | 300 | 193 | 193 |
| | b1 | Methacrylic acid | | | | | 4.5 | 6 |
| | | Ethyl alcohol | | | | | 16.5 | 15 |
| | b2 | Styrene | | | | | 9 | 19 |
| | | Newcol 562SF | | | | | 0.5 | 0.5 |
| | | Deionized water | | | | | 40 | 40 |
| Properties | | Acid value (mg KOH/g) | 65 | 98 | 65 | 65 | 29 | 39 |
| | | Solid content (%) | 25 | 25 | 25 | 25 | 30 | 30 |
| | | Average particle size (μm) | 0.1 | 0.15 | 0.1 | 0.12 | 0.12 | 0.1 |

| | | | Comparative Production Example 5-1 | Comparative Production Example 5-2 | Comparative Production Example 5-3 | Comparative Production Example 5-4 | Comparative Production Example 6-1 | Comparative Production Example 6-2 |
|---|---|---|---|---|---|---|---|---|
| Anionic polymer fine particles | | | B'-1 | B'-2 | B'-3 | B'-4 | B1'-1 | B1'-2 |
| Formulation | b1 | Methacrylic acid | 10 | 10 | | 25 | | |
| | | Methyl methacrylate | | | 10 | | | |
| | | Ethyl acrylate | 60 | 55 | 60 | 45 | 40 | 40 |
| | b2 | Ethylene glycol dimethacrylate | | 35 | | 10 | | 7 |
| | | Divinylbenzene | | | 10 | | | |
| | b3 | Styrene | 30 | | 20 | 20 | | |
| | | Newcol 562SF | | | | | 1.0 | 1.0 |
| | | Deionized water | 300 | 300 | 300.0 | 300 | 193 | 193 |
| | b1 | Methacrylic acid | | | | | 4.5 | |
| | | Ethyl alcohol | | | | | 16.5 | 21 |
| | b2 | Styrene | | | | | 9 | 9 |
| | | Newcol 562SF | | | | | 0.45 | |
| | | Deionized water | | | | | 40 | 40 |

TABLE 1-continued

| Properties | Acid value (mg KOH/g) | 65 | 65 | 0 | 163 | 29 | 0 |
|---|---|---|---|---|---|---|---|
| | Solid content (%) | 25 | 25 | 25 | 25 | 30 | 30 |
| | Average particle size (μm) | 0.1 | 1.5 | 0.12 | 0.4 | 0.12 | 0.12 |

Numerical values in the formulation show parts by mass.

Production of Anionic Polymer Crosslinked Fine Particles (B2)

Production Examples 7-1 and 7-2

Production of Polymer (I)

Production Example 7-1

95 parts by mass of ethylene glycol monohexyl ether and 32 parts by mass of n-butanol were charged in a reaction vessel equipped with a thermometer, a thermostat, a stirrer, a reflux condenser and a dropping device, and mixed by stirring under nitrogen stream, and temperature was elevated to 100° C.

A monomer mixture (50 parts by mass of methacrylic acid, 45 parts by mass of styrene and 5 parts by mass of ethyl acrylate) and a polymerization initiator (2 parts by mass of perbutyl O and 10 parts by mass of n-butanol) solution were simultaneously added dropwise to the reactor over 3 hours. After completion of the dropwise addition, aging was conducted for 30 minutes. A polymerization initiator (0.4 part by mass of perbutyl O and 10 parts by mass of n-butanol) solution was added dropwise for 30 minutes, and aging was conducted for 2 hours. The mixture was diluted with 63 parts by mass of n-butanol to obtain a polymer I-1 having a solid content of 32% by mass, an acid value of 326 mg KOH/g and a weight average molecular weight of 37,000.

Production Example 7-2

95 parts by mass of ethylene glycol monohexyl ether and 32 parts by mass of n-butanol were charged in a reaction vessel equipped with a thermometer, a thermostat, a stirrer, a reflux condenser and a dropping device, and mixed by stirring under nitrogen stream, and temperature was elevated to 100° C.

A monomer mixture (40 parts by mass of methacrylic acid, 30 parts by mass of styrene and 30 parts by mass of ethyl acrylate) and a polymerization initiator (2 parts by mass of perbutyl O and 10 parts by mass of n-butanol) solution were simultaneously added dropwise to the reactor over 3 hours. After completion of the dropwise addition, the resulting mixture was aged for 30 minutes. An initiator solution (0.4 part by mass of perbutyl O and 10 parts by mass of n-butanol) was added dropwise to the reactor over 30 minutes, and the resulting mixture was aged for 2 hours. The mixture was diluted with 63 parts by mass of n-butanol to obtain a polymer I-2 having a solid content of 32% by mass, an acid value of 261 mg KOH/g and a weight average molecular weight of 37,000.

Production Examples 8-1 and 8-2

Production of Epoxy-Modified Polyvinyl Compound (b2)

Production Example 8-1

470 parts by mass of Epicoat #834 (a product of Japan Epoxy Resin Co., Ltd., epoxy equivalent: 230-270, number average molecular weight: about 470) was charged in a reaction vessel equipped with a thermometer, a thermostat, a stirrer and a reflux condenser, and temperature was started to elevate under stirring. 154 parts by mass of methacrylic acid was added at 60° C. and 0.45 part by mass of t-butylcathecol was added at 70° C. Temperature was elevated to 120° C., and 1.2 parts by mass of tributylamine was added. Liquid temperature in the reaction vessel was maintained at 130° C. for 5 hours. The mixture was cooled to 80° C. and taken out of the reaction vessel to obtain an epoxy resin-modified polyvinyl compound 2-1 having an acid value of 1.45 mg KOH/g.

Production Example 8-2

400 parts by mass of YDCN 701 (a product of Tohto Kasei Co., Ltd., trade name, ortho-cresol novolak epoxy resin, number average molecular weight: about 400, epoxy equivalent: 195-220) was charged in a reaction vessel equipped with a thermometer, a thermostat, a stirrer and a reflux condenser, and temperature was started to elevate under stirring.

138 parts by mass of methacrylic acid was added when temperature in the reaction vessel reached 60° C., 0.4 part by mass of t-butylcathecol was added when temperature in the reaction vessel reached 70° C., and 11.0 parts by mass of tributylamine was added when temperature in the reaction vessel reached 120° C. Liquid temperature was maintained at 130° C. for 4 hours. The mixture was cooled to 80° C. and taken out of the reaction vessel to obtain an epoxy resin-modified polyvinyl compound b2-2 having an acid value of 0.8 mg KOH/g.

Production Examples 9-1 and 9-2

Production of Anionic Polymer Crosslinked Fine Particles (B2)

Production Example 9-1

25 parts by mass (solid content) of the polymer I-1 obtained in Production Example 7-1 was neutralized with 3.88 parts by mass of dimethyl ethanolamine in a reaction vessel equipped with a thermometer, a thermostat, a stirrer and a reflux condenser, followed by stirring for 15 minutes, and 250 parts by mass of deionized water was then added.

A monomer mixture shown below was added to deionized water at 30° C. or lower to prepare an emulsion, and the emulsion was added dropwise to the reaction vessel over about 1 hour. Temperature was elevated to 85° C., and a polymerization initiator aqueous solution (0.2 part by mass of ammonium persulfate and 22 parts by mass of deionized water) was added dropwise over 1 hour under nitrogen atmosphere, followed by aging for 2 hours. The resulting mixture was cooled to 30° C., and filtered out with 100 mesh nylon cloth, discharged, and adjusted with deionized water to obtain anionic polymer fine particles B2-1 having a solid content of 20% by mass. The anionic polymer fine particles B2-1 had an acid value of 82 mg KOH/g and an average particle size of 0.18 μm.

Monomer Mixture:

| Deionized water | 75 parts by mass |
|---|---|
| Ethylene glycol dimethacrylate | 7.5 parts by mass |
| Ethyl acrylate | 37.5 parts by mass |
| Styrene | 30 parts by mass |
| Newcol 562SF | 0.75 part by mass |

Production Example 9-2

Anionic polymer fine particles B2-2 were obtained in the same manner as in Production Example 9-1, except for using the formulation shown in Table 2.

Production Example 9-3

25 parts by mass (solid content) of the polymer I-1 obtained in Production Example 7-1 was neutralized with 3.9 parts by mass of dimethyl ethanolamine in a reaction vessel equipped with a thermometer, a thermostat, a stirrer and a reflux condenser. 18 parts by mass of the epoxy resin-modified polyvinyl compound b2-1 obtained in Production Example 8-1 was then added. After stirring for 15 minutes, 250 parts by mass of deionized water was added.

A monomer mixture shown below was added to deionized water at 30° C. or lower to prepare an emulsion, and the emulsion was added dropwise to the reaction vessel over about 1 hour. Temperature was elevated to 85° C., and a polymerization initiator aqueous solution (0.2 part by mass of ammonium persulfate and 22 parts by mass of deionized water) was added dropwise over 1 hour under nitrogen atmosphere, followed by aging for 2 hours. The resulting mixture was cooled to 30° C., filtered with 100 mesh nylon cloth, and discharged to obtain anionic polymer fine particles B2-3 having an average particle size of 0.18 µm, a solid content of 20% by mass and an acid value of 82 mg KOH/g.

Monomer Mixture:

| Deionized water | 75 parts by mass |
|---|---|
| Styrene | 15 parts by mass |
| Ethyl acrylate | 42 parts by mass |
| Newcol 562SF | 0.75 part by mass |

Production Examples 9-4 and 9-5

Anionic polymer fine particles B2-4 and B2-5 were obtained in the same manner as in Production Example 9-3, except for using the formulation shown in Table 2.

Production Example 9-6

25 parts by mass (solid content) of the polymer I-1 obtained in Production Example 7-1 was neutralized with 3.1 parts by mass of dimethyl ethanolamine in a reaction vessel equipped with a thermometer, a thermostat, a stirrer and a reflux condenser. 10.5 parts by mass of the epoxy resin-modified polyvinyl compound b2-2 obtained in Production Example 8-2 was then added. After stirring for 15 minutes, 250 parts by mass of deionized water was added.

A monomer mixture shown below was added to deionized water at 30° C. or lower to prepare an emulsion, and the emulsion was added dropwise to the reaction vessel over about 1 hour. Temperature was elevated to 85° C., and a polymerization initiator aqueous solution (0.2 part by mass of ammonium persulfate and 22 parts by mass of deionized water) was added dropwise over 1 hour under nitrogen atmosphere, followed by aging for 2 hours. The resulting mixture was cooled to 30° C., filtered with 100 mesh nylon cloth, and discharged to obtain anionic polymer fine particles B2-6 having an average particle size of 0.18 µm, a solid content of 20% by mass and an acid value of 82 mg KOH/g.

Monomer Mixture

| Deionized water | 67.5 parts by mass |
|---|---|
| Ethyl acrylate | 42 parts by mass |
| Styrene | 22.5 parts by mass |
| Newcol 562SF | 0.75 part by mass |

Comparative Production Example 9-1

25 parts by mass (solid content) of the polymer I-1 obtained in Production Example 7-1 was neutralized with 3.88 parts by mass of dimethyl ethanolamine in a reaction vessel equipped with a thermometer, a thermostat, a stirrer and a reflux condenser, followed by stirring for 15 minutes, and 250 parts by mass of deionized water was then added.

A monomer mixture shown below was added to deionized water to prepare an emulsion, and the emulsion was added dropwise to the reaction vessel at 30° C. or lower over about 1 hour. Temperature was elevated to 85° C., and a polymerization initiator aqueous solution (0.2 part by mass of ammonium persulfate and 22 parts by mass of deionized water) was added dropwise over 1 hour under nitrogen atmosphere, followed by aging for 2 hours. The resulting mixture was cooled to 30° C., filtered out with 100 mesh nylon cloth, discharged, and adjusted with deionized water to obtain anionic polymer fine particles B2'-1 having a solid content of 20% by mass. The anionic polymer fine particles B2'-1 had an acid value of 82 mg KOH/g and an average particle size of 0.18 µm.

Monomer Mixture:

| Deionized water | 75 parts by mass |
|---|---|
| Ethyl acrylate | 45 parts by mass |
| Styrene | 30 parts by mass |
| Newcol 562SF | 0.75 part by mass |

Comparative Production Example 9-2

Anionic polymer fine particles B2'-2 were obtained in the same manner as in Comparative Production Example 9-1, except for using the formulation shown in Table 2.

Comparative Production Example 9-3

25 parts by mass (solid content) of the polymer I-1 obtained in Production Example 7-1 was neutralized with 3.88 parts by mass of dimethyl ethanolamine in a reaction vessel equipped with a thermometer, a thermostat, a stirrer and a reflux condenser, and 40 parts by mass of the epoxy resin-modified polyvinyl compound b2-1 obtained in Production Example 8-1 was then added. After stirring for 15 minutes, 250 parts by mass of deionized water was added.

A monomer mixture shown below was added to deionized water to prepare an emulsion, and the emulsion was added dropwise to the reaction vessel at 30° C. or lower over about 1 hour. Temperature was elevated to 85° C., and a polymerization initiator aqueous solution (0.2 part by mass of ammonium persulfate and 22 parts by mass of deionized water) was added dropwise over 1 hour under nitrogen atmosphere, followed by aging for 2 hours. The resulting mixture was cooled to 30° C., filtered with 100 mesh nylon cloth, and discharged to obtain anionic polymer fine particles B2'-3 having an average particle size of 0.18 μm, a solid content of 20% by mass and an acid value of 82 mg KOH/g.

Monomer Mixture:

| Deionized water | 75 parts by mass |
| Ethyl acrylate | 25 parts by mass |
| Styrene | 10 parts by mass |
| Newcol 562SF | 0.75 part by mass |

Comparative Production Example 9-4

Anionic polymer fine particles B2'-4 were obtained in the same manner as in Comparative Production Example 9-3, except for using the formulation shown in Table 2.

TABLE 2

| | | | Production Example 9-1 | Production Example 9-2 | Production Example 9-3 | Production Example 9-4 | Production Example 9-5 | Production Example 9-6 |
|---|---|---|---|---|---|---|---|---|
| Anionic polymer fine particles | | | B2-1 | B2-2 | B2-3 | B2-4 | B2-5 | B2-6 |
| Formulation | Polymer (I) | Polymer I-1 | 25 | | 25 | 25 | | 25 |
| | | Polymer I-2 | | 30 | | | 20 | |
| | Neutralizing agent | Dimethyl ethanolamine | 3.9 | 3.1 | 3.9 | 3.1 | 3.9 | 3.1 |
| | b2 | Ethylene glycol dimethacrylate | 7.5 | 7.0 | | | | |
| | | Epoxy resin-modified polyvinyl compound b2-1 | | | | 18 | | 16 |
| | | Epoxy resin-modified polyvinyl compound b2-2 | | | | | 10.5 | 10.5 |
| | b34 | Ethyl acrylate | 37.5 | 35 | 42 | 42 | 48 | 42 |
| | | Styrene | 30 | 28 | 15 | 22.5 | 16 | 23 |
| | Emulsifier | Newcol 562SF | 0.75 | 0.75 | 0.75 | 0.75 | 0.75 | 0.75 |
| | Deionized water | | 75 | 75 | 75 | 75 | 75 | 75 |
| Properties | Acid value (mg KOH/g) | | 82 | 78 | 82 | 82 | 52 | 82 |
| | Solid content (%) | | 20 | 20 | 20 | 20 | 20 | 20 |
| | Average particle size (μm) | | 0.18 | 0.15 | 0.17 | 0.2 | 0.15 | 0.18 |

| | | | Comparative Production Example 9-1 | Comparative Production Example 9-2 | Comparative Production Example 9-3 | Comparative Production Example 9-4 |
|---|---|---|---|---|---|---|
| Anionic polymer fine particles | | | B2'-1 | B2'-2 | B2'-3 | B2'-4 |
| Formulation | Polymer (I) | Polymer I-1 | 25 | 25 | 25 | 20 |
| | | Polymer I-2 | | | | |
| | Neutralizing agent | Dimethyl ethanolamine | 3.9 | 3.9 | 3.9 | 3.9 |
| | b2 | Ethylene glycol dimethacrylate | | 35 | | |
| | | Epoxy resin-modified polyvinyl compound b2-1 | | | 40 | 40 |
| | | Epoxy resin-modified polyvinyl compound b2-2 | | | | |
| | b34 | Ethyl acrylate | 45 | 30 | 25 | 25 |
| | | Styrene | 30 | 10 | 10 | 15 |
| | Emulsifier | Newcol 562SF | 0.75 | 0.75 | 0.75 | 0.75 |
| | Deionized water | | 75 | 75 | 75 | 75 |
| Properties | Acid value (mg KOH/g) | | 82 | 82 | 82 | 65 |
| | Solid content (%) | | 20 | 20 | 20 | 20 |
| | Average particle size (μm) | | 0.18 | 0.8 | 1.0 | 0.8 |

Numerical values in the formulation show parts by mass.

Production of Alkali Thickening Agent (C)

Production Example 10-1

150 parts by mass of deionized water and 0.5 part by mass (solid content) of Newcol 562SF were charged in a reaction vessel equipped with a thermometer, a thermostat, a stirrer, a reflux condenser and a dropping device, and mixed by stirring in nitrogen stream, and temperature was elevated to 85° C.

1% by mass in the following monomer mixture 1 and 5.2 parts by mass of a 2 mass % ammonium persulfate aqueous solution were introduced into the reaction vessel and maintained at 85° C. for 20 minutes. The remaining monomer emulsion and ammonium persulfate aqueous solution were added dropwise to the reactor with a metering pump, and after completion of the dropwise addition, aging was conducted for 2 hours. The mixture in the reactor was cooled to 30° C., filtered with 100 mesh nylon cloth and discharged to obtain en emulsion polymer C-1 having an average particle size of 0.1 µm, a solid content of 25% by mass and an acid value of 196 mg KOH/g.

Monomer Mixture 1:

| | |
|---|---|
| Deionized water | 135 parts by mass |
| Methacrylic acid | 30 parts by mass |
| Styrene | 10 parts by mass |
| Ethyl acrylate | 60 parts by mass |

Ammonium Persulfate Aqueous Solution:

| | |
|---|---|
| Ammonium persulfate | 0.2 part by mass |
| Deionized water | 10 parts by mass |
| Newcol 562SF | 1 part by mass (solid content) |

Production Examples 10-2 and 10-3

Emulsion polymers C-2 and C-3 were obtained in the same manner as in Production Example 10-1, except for using the respective formulation shown in Table 3.

Comparative Production Examples 10-1 and 10-2

Emulsion polymers C'-1 and C'-2 were obtained in the same manner as in Production Example 10-1, except for using the respective formulation shown in Table 3.

Production Example 10-4

Core-Shell Type 115 parts by mass of deionized water and 0.5 part by mass (solid content) of Newcol 562SF were charged in a reaction vessel equipped with a thermometer, a thermostat, a stirrer, a reflux condenser and a dropping device, and mixed by stirring in nitrogen stream, and temperature was elevated to 85° C. 1% by mass in a monomer mixture 1 shown below and 3.3 parts by mass of an ammonium persulfate aqueous solution having the composition shown below were introduced into the reaction vessel and maintained at 85° C. for 20 minutes.

The remaining monomer emulsion was added dropwise to the reactor with a metering pump over 2 hours, and after completion of the dropwise addition, aging was conducted for 1 hour. Subsequently, a monomer mixture 2 shown below and the ammonium persulfate aqueous solution having the composition shown below were added dropwise for 1 hour, and aging was conducted for 2 hours. The mixture in the reactor was cooled to 30° C., filtered with 100 mesh nylon cloth and discharged to obtain en emulsion polymer C-4 having an average particle size of 0.16 am, a solid content of 25% by mass and an acid value of 33 mg KOH/g.

Monomer Mixture 1 (Core):

| | |
|---|---|
| Deionized water | 70 parts by mass |
| Styrene | 30 parts by mass |
| Ethyl acrylate | 39.5 parts by mass |
| Ethylene glycol dimethacrylate | 0.5 part by mass |
| Newcol 562SF | 1 part by mass (solid content) |

Monomer Mixture 2 (Shell):

| | |
|---|---|
| Deionized water | 30 parts by mass |
| Styrene | 5 parts by mass |
| Ethyl acrylate | 20 parts by mass |
| Methacrylic acid | 5 parts by mass |
| Newcol 562SF | 0.5 part by mass (solid content) |

Ammonium Persulfate Aqueous Solution:

| | |
|---|---|
| Ammonium persulfate | 0.5 part by mass |
| Deionized water | 10 parts by mass |

TABLE 3

| | | | | Production Example 10-1 | Production Example 10-2 | Production Example 10-3 | Production Example 10-4 | Comparative Production Example 10-1 | Comparative Production Example 10-2 |
|---|---|---|---|---|---|---|---|---|---|
| Emulsion polymer | | | | C-1 | C-2 | C-3 | C-4 | C'-1 | C'-2 |
| Formulation | First step | c1 | Methcarylic acid | 30 | 40 | 30 | | 5 | |
| | | | Acrylic acid | | | | | | 65 |
| | | | Ethyl acrylate | 60 | 50 | 59.8 | 39.5 | 70 | |
| | | | 2-Ethylhexyl acrylate | | | | | | 25 |
| | | | Methyl methacrylate | | | | | | 10 |
| | | c2 | Ethylene glycol dimethacrylate | | | 0.2 | 0.5 | | |
| | | c3 | Styrene | 10 | 10 | 10 | 30 | 25 | |
| | | | Newcol 562SF | 1 | 1 | 1 | 1 | 1 | 1 |
| | | | Deionized water | 135 | 135 | 135 | 70 | 135 | 135 |

TABLE 3-continued

|  |  |  | Production Example 10-1 | Production Example 10-2 | Production Example 10-3 | Production Example 10-4 | Comparative Production Example 10-1 | Comparative Production Example 10-2 |
|---|---|---|---|---|---|---|---|---|
| Second step | c1 | Ethyl acrylate |  |  |  | 15 |  |  |
|  |  | Methacrylic acid |  |  |  | 10 |  |  |
|  | c3 | Styrene |  |  |  | 5 |  |  |
|  |  | Newcol 562SF |  |  |  | 0.5 |  |  |
|  |  | Ammonium persulfate |  |  |  | 0.5 |  |  |
|  |  | Deionized water | 10 | 10 | 10 | 10 | 10 | 10 |
| Properties | Acid value (mg KOH/g) |  | 196 | 261 | 196 | 65 | 33 | 507 |
|  | Solid content (%) |  | 25 | 25 | 25 | 25 | 25 | 20 |
|  | Average particle size (μm) |  | 0.1 | 0.13 | 0.11 | 0.16 | 0.1 | 0.8 |

Numerical values in the formulation show parts by mass.

Production of Coating Composition for Cans

Example 1

80 parts by mass (solid content: 20 parts by mass) of the anionic polymer fine particles B-1 having a solid content of 25% by mass was added to 333.3 parts by mass (solid content: 100 parts by mass) of the acryl-modified epoxy resin (A) dispersion having a solid content of 30% by mass obtained in Production Example 3, followed by stirring for about 30 minutes. 66.7 parts by mass of deionized water was gradually added to the resulting mixture to obtain a can paint No. 1 having a solid content of 25% by mass.

Examples 2 to 4 and 6 to 9 and Comparative Examples 1 to 4 and 6 to 9

Can paint Nos. 2 to 18 each having a solid content of 25% by mass were obtained in the same manner as in Example 1, except for using the respective formulation shown in Table 4.

Example 5

80 parts by mass (solid content: 20 parts by mass) of the anionic polymer fine particles B1-1 having a solid content of 25% by mass and 2.8 parts by mass (solid content: 1.7 parts by mass) of the resol type phenolic resin (D) having a solid content of 60% by mass obtained in Production Example 4 were added to 333.3 parts by mass (solid content: 100 parts by mass) of the acryl-modified epoxy resin (A) dispersion having a solid content of 30% by mass obtained in Production Example 3, followed by stirring for about 30 minutes. 70.7 parts by mass of deionized water was gradually added to the resulting mixture to obtain a can paint No. 5 having a solid content of 25% by mass.

Comparative Example 5

80 parts by mass (solid content: 20 parts by mass) of the anionic polymer fine particles B1'-1 having a solid content of 25% by mass and 2.8 parts by mass (solid content: 1.7 parts by mass) of the resol type phenolic resin (D) having a solid content of 60% by mass obtained in Production Example 4 were added to 333.3 parts by mass (solid content: 100 parts by mass) of the acryl-modified epoxy resin (A) dispersion having a solid content of 30% by mass obtained in Production Example 3, followed by stirring for about 30 minutes. 70.7 parts by mass of deionized water was gradually added to the resulting mixture to obtain a can paint No. 14 having a solid content of 25% by mass.

Example 7

80 parts by mass (solid content: 20 parts by mass) of the anionic polymer fine particles B-1 having a solid content of 25% by mass and 2.8 parts by mass (solid content: 1.7 parts by mass) of the resol type phenolic resin (D) having a solid content of 60% by mass obtained in Production Example 4 were added to 333.3 parts by mass (solid content: 100 parts by mass) of the acryl-modified epoxy resin (A) dispersion having a solid content of 30% by mass obtained in Production Example 3, followed by stirring for about 30 minutes. 70.7 parts by mass of deionized water was gradually added to the resulting mixture to obtain a can paint No. 7 having a solid content of 25% by mass.

Comparative Example 7

80 parts by mass (solid content: 20 parts by mass) of the anionic polymer fine particles B'-1 having a solid content of 25% by mass and 2.8 parts by mass (solid content 1.7 parts by mass) of the resol type phenolic resin (D) having a solid content of 60% by mass obtained in Production Example 4 were added to 333.3 parts by mass (solid content: 100 parts by mass) of the acryl-modified epoxy resin (A) dispersion having a solid content of 30% by mass obtained in Production Example 3, followed by stirring for about 30 minutes. 70.7 parts by mass of deionized water was gradually added to the resulting mixture to obtain a can paint No. 16 having a solid content of 25% by mass.

TABLE 4

|  |  |  | Example | | | | | | | | |
|---|---|---|---|---|---|---|---|---|---|---|---|
|  |  |  | 1 | 2 | 3 | 4 | 5 | 6 | 7 | 8 | 9 |
| Can paint Formulation |  |  | No. 1 | No. 2 | No. 3 | No. 4 | No. 5 | No. 6 | No. 7 | No. 8 | No. 9 |
|  | (A) | Acryl-modified epoxy resin dispersion | 100 | 100 | 100 | 100 | 100 | 100 | 100 | 100 | 100 |
|  | (B) | Anionic polymer fine particle B-1 | 20 |  |  |  |  |  | 20 | 5 | 50 |
|  |  | Anionic polymer |  | 20 |  |  |  |  |  |  |  |

TABLE 4-continued

| | | | | | | | | | |
|---|---|---|---|---|---|---|---|---|---|
| fine particle B-2 | | | | | | | | | |
| Anionic polymer fine particle B-3 | 20 | | | | | | | | |
| Anionic polymer fine particle B-4 | | 20 | | | | | | | |
| Anionic polymer fine particle B1-1 | | | 20 | | | | | | |
| Anionic polymer fine particle B1-2 | | | | 20 | | | | | |
| Anionic polymer fine particle B'-1 | | | | | | | | | |
| Anionic polymer fine particle B'-2 | | | | | | | | | |
| Anionic polymer fine particle B'-3 | | | | | | | | | |
| Anionic polymer fine particle B'-4 | | | | | | | | | |
| Anionic polymer fine particle B1'-1 | | | | | | | | | |
| Anionic polymer fine particle B1'-2 | | | | | | | | | |
| (D) Resol type phenolic resin | | | | | 1.7 | | 1.7 | | |
| Coating film cross section observation (µm) | 0.1 | 0.15 | 0.08 | 0.05 | 0.1 | 0.1 | 0.1 | 0.1 | 0.1 |
| Coating film performance — T-bend bending processability | A | A | A | A | AA | A | AA | A | A |
| Retort adhesion of T-bend bending processed part | A | A | A | A | AA | AA | AA | A | A |
| Retort whitening resistance | A | A | A | A | A | A | A | A | A |
| Corrosion resistance after processing | A | A | A | A | A | A | A | A | A |
| Flavor properties | A | A | A | A | AA | AA | A | A | A |

| | | Comparative Example | | | | | | | | |
|---|---|---|---|---|---|---|---|---|---|---|
| | | 1 | 2 | 3 | 4 | 5 | 6 | 7 | 8 | 9 |
| Can paint | | No. 10 | No. 11 | No. 12 | No. 13 | No. 14 | No. 15 | No. 16 | No. 17 | No. 18 |
| Formulation (A) Acryl-modified epoxy resin dispersion | | 100 | 100 | 100 | 100 | 100 | 100 | 100 | 100 | 100 |
| (B) Anionic polymer fine particle B-1 | | | | | | | | | 0.5 | 60 |
| Anionic polymer fine particle B-2 | | | | | | | | | | |
| Anionic polymer fine particle B-3 | | | | | | | | | | |
| Anionic polymer fine particle B-4 | | | | | | | | | | |
| Anionic polymer fine particle B1-1 | | | | | | | | | | |
| Anionic polymer fine particle B1-2 | | | | | | | | | | |
| Anionic polymer fine particle B'-1 | | 20 | | | | | | 20 | | |
| Anionic polymer fine particle B'-2 | | | 20 | | | | | | | |
| Anionic polymer fine particle B'-3 | | | | 20 | | | | | | |
| Anionic polymer fine particle B'-4 | | | | | 20 | | | | | |
| Anionic polymer fine particle B1'-1 | | | | | | 20 | | | | |
| Anionic polymer fine particle B1'-2 | | | | | | | 20 | | | |
| (D) Resol type phenolic resin | | | | | | 1.7 | | 1.7 | | |
| Coating film cross section observation (µm) | | 0.7 | 1.5 | 0.4 | *1 | *1 | *1 | *1 | 0.1 | 0.1 |
| Coating film performance — T-bend bending processability | | A | C | A | B | B | B | B | A | B |
| Retort adhesion of T-bend bending processed part | | C | B | B | B | B | B | B | C | B |
| Retort whitening | | C | A | B | C | B | B | B | A | B |

TABLE 4-continued

| | | | | | | | | | |
|---|---|---|---|---|---|---|---|---|---|
| resistance | | | | | | | | | |
| Corrosion resistance after processing | C | C | B | C | B | B | B | C | C |
| Flavor properties | B | A | B | B | B | B | B | A | B |

*1: No sea-island structure
Numerical values in the formulation show parts by mass.

Example 10

80 parts by mass (solid content; 20 parts by mass) of the anionic polymer fine particles B2-1 having a solid content of 25% by mass was added to 333.3 parts by mass (solid content: 100 parts by mass) of the acryl-modified epoxy resin dispersion having a solid content of 30% by mass obtained in Production Example 3, followed by stirring for about 30 minutes. 66.7 parts by mass of deionized water was gradually added to the resulting mixture to obtain a can paint No. 19 having a solid content of 25% by mass.

Examples 11 to 13 and 16 to 18 and Comparative Examples 10 to 13, 15 and 16

Can paint Nos. 20 to 34 each having a solid content of 25% by mass were obtained in the same manner as in Example 10, except for using the respective formulation shown in Table 5.

Example 14

80 parts by mass (solid content: 20 parts by mass) of the anionic polymer fine particles B2-5 having a solid content of 25% by mass and 2.8 parts by mass (solid content: 1.7 parts by mass) of the resol type phenolic resin (D) having a solid content of 60% by mass were added to 333.3 parts by mass (solid content: 100 parts by mass) of the acryl-modified epoxy resin dispersion (A) having a solid content of 30% by mass obtained in Production Example 3, followed by stirring for about 30 minutes. 70.7 parts by mass of deionized water was gradually added to the resulting mixture to obtain a can paint No. 23 having a solid content of 25% by mass.

Comparative Example 14

80 parts by mass (solid content: 20 parts by mass) of the anionic polymer fine particles B2'-1 having a solid content of 25% by mass and 2.8 parts by mass (solid content: 1.7 parts by mass) of the resol type phenolic resin (D) having a solid content of 60% by mass were added to 333.3 parts by mass (solid content: 100 parts by mass) of the acryl-modified epoxy resin dispersion (A) having a solid content of 30% by mass obtained in Production Example 3, followed by stirring for about 30 minutes. 70.7 parts by mass of deionized water was gradually added to the resulting mixture to obtain a can paint No. 32 having a solid content of 25% by mass.

Example 15

80 parts by mass (solid content: 20 parts by mass) of the anionic polymer fine particles B2-1 having a solid content of 25% by mass and 2.8 parts by mass (solid content: 1.7 parts by mass) of the resol type phenolic resin (D) having a solid content of 60% by mass were added to 333.3 parts by mass (solid content: 100 parts by mass) of the acryl-modified epoxy resin dispersion (A) having a solid content of 30% by mass obtained in Production Example 3, followed by stirring for about 30 minutes. 70.7 parts by mass of deionized water was gradually added to the resulting mixture to obtain a can paint No. 24 having a solid content of 25% by mass.

TABLE 5

| | | | Example | | | | | | | | |
|---|---|---|---|---|---|---|---|---|---|---|---|
| | | | 10 | 11 | 12 | 13 | 14 | 15 | 16 | 17 | 18 |
| Can paint | | | No. 19 | No. 20 | No. 21 | No. 22 | No. 23 | No. 24 | No. 25 | No. 26 | No. 27 |
| Formulation | (A) | Acryl-modified epoxy resin dispersion | 100 | 100 | 100 | 100 | 100 | 100 | 100 | 100 | 100 |
| | (B) | Anionic polymer fine particle B2-1 | 20 | | | | | 20 | 5 | 10 | 50 |
| | | Anionic polymer fine particle B2-2 | | 20 | | | | | | | |
| | | Anionic polymer fine particle B2-3 | | | 20 | | | | | | |
| | | Anionic polymer fine particle B2-4 | | | | 20 | | | | | |
| | | Anionic polymer fine particle B2-5 | | | | | 20 | | | | |
| | | Anionic polymer fine particle B2'-1 | | | | | | | | | |
| | | Anionic polymer fine particle B2'-2 | | | | | | | | | |
| | | Anionic polymer fine particle B2'-3 | | | | | | | | | |
| | | Anionic polymer fine particle B2'-4 | | | | | | | | | |
| | (D) | Resol type phenolic resin | | | | | 1.7 | 1.7 | | | |

TABLE 5-continued

| | | | | | | | | | | |
|---|---|---|---|---|---|---|---|---|---|---|
| Coating film cross section observation (μm) | | 0.1 | 0.15 | 0.08 | 0.05 | 0.1 | 0.1 | 0.1 | 0.1 | 0.1 |
| Coating film performance | T-bend bending processability | A | A | A | A | AA | AA | A | A | A |
| | Retort adhesion of T-bend bending processed part | A | A | A | A | AA | AA | A | A | A |
| | Retort whitening resistance | A | A | A | A | A | A | A | A | A |
| | Corrosion resistance after processing | A | A | A | A | AA | AA | A | A | A |
| | Flavor properties | A | A | A | A | A | A | A | A | A |

| | | | Comparative Example | | | | | | |
|---|---|---|---|---|---|---|---|---|---|
| | | | 10 | 11 | 12 | 13 | 14 | 15 | 16 |
| Can paint | | | No. 28 | No. 29 | No. 30 | No. 31 | No. 32 | No. 33 | No. 34 |
| Formulation | (A) | Acryl-modified epoxy resin dispersion | 100 | 100 | 100 | 100 | 100 | 100 | 100 |
| | (B) | Anionic polymer fine particle B2-1 | | | | | | 0.5 | 60 |
| | | Anionic polymer fine particle B2-2 | | | | | | | |
| | | Anionic polymer fine particle B2-3 | | | | | | | |
| | | Anionic polymer fine particle B2-4 | | | | | | | |
| | | Anionic polymer fine particle B2-5 | | | | | | | |
| | | Anionic polymer fine particle B2'-1 | 20 | | | | 20 | | |
| | | Anionic polymer fine particle B2'-2 | | 20 | | | | | |
| | | Anionic polymer fine particle B2'-3 | | | 20 | | | | |
| | | Anionic polymer fine particle B2'-4 | | | | 20 | | | |
| | (D) | Resol type phenolic resin | | | | | 1.7 | | |
| Coating film cross section observation (μm) | | | 0.7 | 1 | 1.2 | 1 | 0.7 | 0.1 | 0.1 |
| Coating film performance | T-bend bending processability | | A | C | C | C | A | A | B |
| | Retort adhesion of T-bend bending processed part | | C | B | B | B | B | C | B |
| | Retort whitening resistance | | C | A | A | A | C | A | B |
| | Corrosion resistance after processing | | C | C | C | C | C | C | C |
| | Flavor properties | | B | A | A | A | B | A | B |

Numerical values in the formulation show parts by mass.

Example 19

80 parts by mass (solid content: 20 parts by mass) of the anionic polymer fine particles B-1 having a solid content of 25% by mass obtained in Production Example 5-1 and 8 parts by mass (solid content: 2 parts by mass) of the emulsion polymer C-1 obtained in Production Example 10-1 were added to 333.3 parts by mass (solid content: 100 parts by mass) of the acryl-modified epoxy resin dispersion (A) having a solid content of 30% by mass obtained in Production Example 3, followed by stirring for about 30 minutes. 66.7 parts by mass of deionized water was gradually added to the resulting mixture to obtain a can paint No. 35 having a solid content of 25% by mass.

Examples 20 to 31

Can paint Nos. 36 to 47 were obtained in the same manner as in Example 19, except for using the respective formulation shown in Table 6.

PRIMAL ASE-60: a product of Rohm and Haas Company, trade name, alkali thickening agent YODOSOL KA-10K: a product of Nippon NSC, trade name, alkali thickening agent THIXOL K-130B: a product of Kyoeisha Chemical Co., Ltd., trade name, alkali thickening agent VISCALEX HV-30: a product of Ciba Geigy, trade name, alkali thickening agent

TABLE 6

|  |  |  | Example |  |  |  |  |  |  |
|---|---|---|---|---|---|---|---|---|---|
|  |  |  | 19 | 20 | 21 | 22 | 23 | 24 | 25 |
| Can paint Formulation | (A) | Acryl-modified epoxy resin dispersion | No. 35 100 | No. 36 100 | No. 37 100 | No. 38 100 | No. 39 100 | No. 40 100 | No. 41 100 |
|  | (B) | Anionic polymer crosslinked fine particle B-1 | 20 |  | 20 | 20 |  | 20 |  |
|  |  | Anionic polymer crosslinked fine particle B2-6 |  | 20 |  |  | 20 |  | 20 |
|  |  | Emulsion polymer C-1 | 2 | 2 |  |  |  |  |  |
|  |  | Emulsion polymer C-2 |  |  |  | 2 |  |  |  |
|  |  | Emulsion polymer C-3 |  |  |  |  | 2 |  |  |
|  |  | Emulsion polymer C-4 |  |  |  |  |  | 2 |  |
|  |  | PRIMAL ASE-60 |  |  |  |  |  | 2 | 2 |
|  |  | YODOSOL KA-10K |  |  |  |  |  |  |  |
|  |  | THIXOL K-130B |  |  |  |  |  |  |  |
|  |  | VISCALEX HV-30 |  |  |  |  |  |  |  |
|  | (D) | Resol type phenolic resin |  |  |  |  |  |  | 1.7 |
| Coating film cross section observation (μm) |  |  | 0.1 | 0.15 | None | 0.15 | 0.15 | 0.08 | 0.1 |
| Coating film performance | T-bend bending processability |  | A | A | A | A | A | A | AA |
|  | Retort adhesion of T-bend bending processed part |  | A | A | A | A | A | A | AA |
|  | Retort whitening resistance |  | A | A | A | A | A | A | A |
|  | Corrosion resistance after processing |  | A | A | A | A | A | A | A |
|  | Flavor properties |  | A | A | A | A | A | A | AA |
| Coating workability | Sag resistance |  | AA | AA | AA | AA | AA | AA | AA |
|  | Coating film smoothness |  | A | A | AA | A | A | A | A |

|  |  |  | Example |  |  |  |  |  |
|---|---|---|---|---|---|---|---|---|
|  |  |  | 26 | 27 | 28 | 29 | 30 | 31 |
| Can paint Formulation | (A) | Acryl-modified epoxy resin dispersion | No. 42 100 | No. 43 100 | No. 44 100 | No. 45 100 | No. 46 100 | No. 47 100 |
|  | (B) | Anionic polymer crosslinked fine particle B-1 |  |  |  |  |  |  |
|  |  | Anionic polymer crosslinked fine particle B2-6 | 20 | 20 | 20 | 20 | 20 | 20 |
|  | (C) | Emulsion polymer C-1 |  | 2 | 1 |  |  |  |
|  |  | Emulsion polymer C-2 |  |  |  |  |  |  |
|  |  | Emulsion polymer C-3 |  |  |  |  |  |  |
|  |  | Emulsion polymer C-4 |  |  |  |  |  |  |
|  |  | PRIMAL ASE-60 | 2 |  |  |  |  |  |
|  |  | YODOSOL KA-10K |  |  |  | 2 |  |  |
|  |  | THIXOL K-130B |  |  |  |  | 2 |  |
|  |  | VISCALEX HV-30 |  |  |  |  |  | 2 |
|  | (D) | Resol type phenolic resin |  |  |  |  |  |  |
| Coating film cross section observation (μm) |  |  | 0.1 | 0.08 | 0.08 | 0.08 | 0.05 | 0.05 |
| Coating film performance | T-bend bending processability |  | A | A | A | A | A | A |
|  | Retort adhesion of T-bend bending processed part |  | A | A | A | A | A | A |

TABLE 6-continued

|  |  |  |  |  |  |  |  |
|---|---|---|---|---|---|---|---|
|  | Retort whitening resistance | A | A | A | A | A | A |
|  | Corrosion resistance after processing | A | A | A | A | A | A |
|  | Flavor properties | A | A | A | A | A | A |
| Coating workability | Sag resistance | AA | AA | AA | AA | AA | AA |
|  | Coating film smoothness | A | A | AA | A | A | A |

Numerical values in the formulation show parts by mass.

Comparative Examples 17 to 29

Can paint Nos. 47 to 60 were obtained in the same manner as in Example 19, except for using the respective formulation shown in Table 7.

TABLE 7

|  |  |  | Comparative Example | | | | | | |
|---|---|---|---|---|---|---|---|---|---|
|  |  |  | 17 | 18 | 19 | 20 | 21 | 222 | 23 |
| Can paint Formulation |  |  | No. 48 | No. 49 | No. 50 | No. 51 | No. 52 | No. 53 | No. 54 |
|  | (A) | Acryl-modified epoxy resin dispersion | 100 | 100 | 100 | 100 | 100 | 100 | 100 |
|  | (B) | Anionic polymer crosslinked fine particle B-1 | 20 | 20 | 20 | 20 | 20 | 20 | 20 |
|  |  | Anionic polymer-crosslinked fine particle B2-6 |  |  |  |  |  |  |  |
|  | (C) | Emulsion polymer C-1 | 0.02 | 15 |  |  |  |  |  |
|  |  | Emulsion polymer C-3 |  |  | 15 |  |  |  |  |
|  |  | Emulsion polymer C'-1 |  |  |  | 2 |  |  |  |
|  |  | Emulsion polymer C'-2 |  |  |  |  | 2 |  |  |
|  |  | Emulsion polymer C-4 |  |  |  |  |  | 20 |  |
|  |  | PRIMAL ASE-60 |  |  |  |  |  |  | 15 |
|  | (D) | Resol type phenolic resin |  |  |  |  |  |  |  |
| Coating film cross section observation (μm) |  |  | 0.1 | 0.15 | None | 0.15 | 0.15 | 0.15 | 0.08 |
| Coating film performance | T-bend bending processability |  | A | B | B | A | A | B | B |
|  | Retort adhesion of T-bend bending processed part |  | A | B | B | A | A | B | B |
|  | Retort whitening resistance |  | A | C | C | A | B | C | B |
|  | Corrosion resistance after processing |  | A | B | B | A | A | B | B |
|  | Flavor properties |  | A | B | B | B | B | B | C |
| Coating workability | Sag resistance |  | B | AA | AA | BC | B | AA | A |
|  | Coating film smoothness |  | B | C | C | B | B | C | C |

|  |  |  | Example | | | | | |
|---|---|---|---|---|---|---|---|---|
|  |  |  | 24 | 25 | 26 | 27 | 28 | 29 |
| Can paint Formulation |  |  | No. 55 | No. 56 | No. 57 | No. 58 | No. 59 | No. 60 |
|  | (A) | Acryl-modified epoxy resin dispersion | 100 | 100 | 100 | 100 | 100 | 100 |
|  | (B) | Anionic polymer crosslinked fine particle B-1 |  |  |  |  |  |  |
|  |  | Anionic polymer crosslinked fine particle B2-6 | 20 | 20 | 20 | 20 | 20 |  |

TABLE 7-continued

|  |  |  |  |  |  |  |  |  |
|---|---|---|---|---|---|---|---|---|
| | (C) | Emulsion polymer C-1 | 15 | | | | | 2 |
| | | Emulsion polymer C-3 | | | | | | |
| | | Emulsion polymer C'-1 | | 2 | | | | |
| | | Emulsion polymer C'-2 | | | 2 | | | |
| | | Emulsion polymer C-4 | | | | 15 | | |
| | | PRIMAL ASE-60 | | | | | 15 | |
| | (D) | Resol type phenolic resin | 1.7 | | | | | |
| Coating film cross section observation (μm) | | | 0.1 | 0.1 | 0.08 | 0.08 | 0.08 | 0.08 |
| Coating film performance | T-bend bending processability | | B | A | A | C | B | B |
| | Retort adhesion of T-bend bending processed part | | B | A | A | C | B | C |
| | Retort whitening resistance | | C | A | B | B | C | A |
| | Corrosion resistance after processing | | C | A | A | B | C | C |
| | Flavor properties | | B | B | A | B | C | A |
| Coating workability | Sag resistance | | A | B | B | AA | AA | AA |
| | Coating film smoothness | | BC | B | B | C | C | A |

Numerical values in the formulation show parts by mass.

Preparation of Test Plate

Each of the can paints obtained in Examples 1 to 31 and Comparative Examples 1 to 29 was applied by spray coating to #5182 aluminum plate having a thickness of 0.26 mm and having a phosphoric chromate treatment applied thereto such that a dry thickness is 10 μm, and cured by baking at 200° C. for 3 minutes to prepare a coated plate. The performance test was conducted according to the following test method. The results obtained in Examples 1 to 9 and Comparative Examples 1 to 9 are shown in Table 4, the results obtained in Examples 10 to 18 and Comparative Examples 10 to 16 are shown in Table 5, and the results obtained in Examples 19 to 31 are shown in Table 6, and the results obtained in Comparative Examples 17 to 29 are shown in Table 7.

Coating Film Cross Section Observation (μm):

A coating film cross section formed by cutting a test plate was observed with a scanning electron microscope (magnification: 5,000), and when a sea-island structure could be observed, an average value (μm) of width (long diameter) in a longitudinal direction in 30 circular or elliptical islands that can be recognized in an area of 10 μm×10 μm was obtained.

T-Bend Bending Processability:

A coated test plate was cut to 5 cm in a rolling direction and 4 cm in a vertical direction. In a room at 20° C., using a special bend (haze-ori) type DuPont impact tester, the under part of the cut piece of the coated test plate was bent double, and two aluminum plates having a thickness of 0.26 mm were sandwiched between the bent portions of the cut piece. The assembly was set in the tester. A 1 kg iron weight having a contact face being flat was dropped from a height of 50 cm to give impact to the bent portion. Electric current was passed through a tip of the bent portion at applied voltage of 6.5V for 6 seconds to measure current value (mA) in 20 mm width of the bent tip portion. Evaluation was made by the following criteria.

AA: Less than 20 mA
A: 20 mA to less than 40 mA
B: 40 mA to less than 80 mA
C: 80 mA or more Retort Adhesion of T-Bend Bending Processed Part:

A coated test plate was cut to 5 cm in a rolling direction and 4 cm in a vertical direction. In a room at 20° C., using a special bend (haze-ori) type DuPont impact tester, the under part of the cut coated test plate was bent double, and two aluminum plates having a thickness of 0.26 mm were sandwiched between the bent portions of the cut piece. The assembly was set in the tester. A 1 kg iron weight having a contact face being flat was dropped from a height of 50 cm to give impact to the bent portion. The test piece was dipped in water in an autoclave at 125° C. for 30 minutes. Water was wiped out, and the processed part was subjected to a peel test with cellophane tape. Electric current was passed through a tip of the portion at applied voltage of 6.5V for 6 seconds to measure current value (mA) in 20 mm width of the bent tip portion. Evaluation was made by the following criteria.

AA: Less than 20 mA
A: 20 mA to less than 40 mA
B: 40 mA to less than 80 mA
C: 80 mA or more Retort Whitening Resistance:

A coated test piece was dipped in water and treated in an autoclave at 125° C. for 30 minutes. Whitening state of a coating film after the treatment was evaluated by the following criteria.

AA: Whitening is not recognized at all.
A: Whitening is lightly recognized.
B: A little whitening is recognized.
C: Remarkable whitening is recognized.

Corrosion Resistance After Processing:

A test piece is provided similar to the above T-bend processing test, and was similarly subjected to bending processing. The test piece thus processed was dipped in a mixed aqueous solution containing 1 mass % of each of citric acid, tartaric acid and sodium chloride dissolved therein, and stored at 40° C. for 2 weeks. The state of the bending processed part was visually evaluated by the following criteria.

AA: Corrosion is not recognized.
A: Corrosion is slightly recognized.
B: Corrosion is considerably recognized.
C: Corrosion is remarkable.

Flavor Properties:

Each test piece was dipped and stored in a liquid prepared by adding 30 mg/liter of d-limonene (perfume) to deionized water and dispersing with 1 g/liter of S-1170 (a product of Mitsubishi Chemical Corporation, sucrose fatty acid ester) at 35° C. for one month. After the storage, for the measurement of d-limonene (perfume) on a coating film due to sorption, the test plate was dipped in diethyl ether at 20° C. for one week to extract d-limonene. The d-limonene extracted was measured with gas chromatography, and evaluated by the following criteria.

A: Extracted d-limonene is less than 0.6 mg per 120 mg of coating film weight.
B: Extracted d-limonene is from 0.6 mg to less than 1.6 mg per 120 mg of coating film weight.
C: Extracted d-limonene is more than 1.6 mg per 120 mg of coating film weight.

Sag Resistance:

Each paint is applied to a tin plate having a lower half masked with a tape, with an airless spray coating device such that a wet film thickness is 150, 175, 200, 225, 250, 275 and 300 μm. The coated plate is immediately set up vertically. The masking tape is peeled from the plate, and the plate is allowed to stand for 60 seconds as it is. The coating is baked at 200° C. for 3 minutes, and sag trace is visually evaluated according to the following criteria.

AA: Film thickness gradient of a paint is recognized on the whole, but sag trace (tear shape) of a paint is not observed even in a wet thickness of 300 μm.
A: Film thickness gradient of a paint is recognized on the whole, but sag trace (tear shape) of a paint is not observed in a wet thickness of 250 μm or less.
B: Film thickness gradient of a paint is recognized on the whole, but sag trace (tear shape) of a paint is not observed in a wet thickness of 175 μm or less.
C: Sag trace of a paint is observed in all of levels.

Coating Film Smoothness:

Regarding a coating film after drying under the condition of a wet thickness of 250 μm in sag resistance test, the coated surface is visually observed, and evaluated according to the following criteria.

A: Film thickness gradient of a paint is recognized on the whole, but surface has luster, and gloss feeling is good.
B: Film thickness gradient of a paint is recognized on the whole, but unevenness is slightly seen on the entire coating surface, and luster feeling is slightly poor.
C: Large unevenness is seen on the entire coating surface.

According to the coating composition for cans of the invention, metal cans having excellent bending processability, water whitening resistance and flavor properties can be provided.

While the present invention has been described in detail and with reference to specific embodiments thereof, it will be apparent to one skilled in the art that various changes and modifications can be made therein without departing from the spirit and scope thereof.

The present application is based on Japanese patent application Nos. 2006-083721, 2006-086673 and 2007-047280, and the contents thereof are herein incorporated by reference.

What is claimed is:

1. A coating composition for cans comprising 100 parts by mass of a neutralized acrylic resin-modified epoxy resin (A), and from 1 to 50 parts by mass of anionic polymer crosslinked fine particles (B), (A) and (B) being dispersed in an aqueous medium,
   wherein the anionic polymer fine particles (B) are polymer fine particles comprising a polymer having an acid value of from 10 to 120 mg KOH/g and being produced by polymerizing radically polymerizable unsaturated monomers comprising from 2 to 30% by mass of a carboxyl group-containing radically polymerizable unsaturated monomer (b1), from 2 to 30% by mass of a polyvinyl compound (b2) and from 40 to 96% by mass of other radically polymerizable unsaturated monomer (b3) in the presence of water.

2. The coating composition for cans as claimed in claim 1, further comprising from 0.1 to 10 parts by mass of an alkali thickening agent (C), which is an emulsion polymer having an acid value of from 50 to 500 mg KOH/g and being produced by polymerizing radically polymerizable unsaturated monomers comprising from 10 to 60% by mass of a carboxyl group-containing radically polymerizable unsaturated monomer (c1), 1% by mass or less of a polyvinyl compound (c2) and from 39 to 90% by mass of other radically polymerizable unsaturated monomer (c3) in the presence of water.

3. The coating composition for cans as claimed in claim 1, wherein the anionic polymer crosslinked fine particles (B) are anionic polymer crosslinked fine particles (B1) obtained by:
   a first step of emulsion polymerizing a mixture (1) of radically polymerizable monomers comprising 5% by mass or less of the carboxyl group-containing radically polymerizable unsaturated monomer (b1), from 4 to 35% by mass of the polyvinyl compound (b2) and from 60 to 96% by mass of other radically polymerizable unsaturated monomer (b31) in the presence of water to obtain an aqueous dispersion (I); and
   a second step of emulsion polymerizing a mixture (2) of radically polymerizable monomers comprising from 10 to 35% by mass of the carboxyl group-containing radically polymerizable unsaturated monomer (b1) and from 65 to 90% by mass of other radically polymerizable unsaturated monomer (b32) in the presence of the aqueous dispersion (I) and water.

4. The coating composition for cans as claimed in claim 1, wherein the anionic polymer crosslinked fine particles (B) are anionic polymer crosslinked fine particles (B2) obtained by:
   radically polymerizing a mixture (3) of radically polymerizable monomers comprising from 20 to 60% by mass of the carboxyl group-containing radically polymerizable unsaturated monomer (b1) and from 40 to 80% by mass of other radically polymerizable unsaturated monomer (b33) to obtain a polymer (I), and
   emulsion polymerizing a mixture (4) of radically polymerizable monomers comprising from 4 to 33% by mass of the polyvinyl compound (b2) and from 67 to 96% by mass of other radically polymerizable unsaturated monomer (b34) in the presence of the polymer (I) and water.

5. The coating composition for cans as claimed in claim 1, wherein the polyvinyl compound (b2) is an adduct of an epoxy resin having an epoxy equivalent of from 180 to 1,000 and having at least two epoxy groups in one molecule, and methacrylic acid and/or acrylic acid.

6. The coating composition for cans as claimed in claim 1, wherein the acrylic resin-modified epoxy resin (A) is a resin obtained by esterifying a bisphenol A type epoxy resin (a1) having a number average molecular weight of from 2,000 to 35,000 and a carboxyl group-containing acrylic resin (a2), or a resin obtained by graft polymerizing a polymerizable unsaturated monomer component comprising a carboxyl group-containing polymerizable unsaturated monomer (a3) onto the bisphenol A type epoxy resin (a1).

7. The coating composition for cans as claimed in claim 1, further comprising a resol-type phenolic resin (D) in an amount of from 0.1 to 10 parts by mass per 100 parts by mass of the acrylic resin-modified epoxy resin (A).

8. The coating composition for cans as claimed in claim 1, which forms a sea-island structure that the acrylic resin-modified epoxy resin (A) forms sea and the anionic polymer crosslinked fine particles (B) form island having a diameter of from 0.01 to 0.5 μm in a cross section of a coating film obtained by applying the coating composition.

* * * * *